United States Patent
Deevey et al.

(10) Patent No.: US 10,843,651 B2
(45) Date of Patent: Nov. 24, 2020

(54) MONUMENT MOUNTED AIRBAG

(71) Applicant: SCHROTH SAFETY PRODUCTS LLC, Pompano Beach, FL (US)

(72) Inventors: Mark Edward Deevey, Coral Springs, FL (US); Bryant Earl Williams, Sunrise, FL (US); Stephen Bryant Adkins, Coral Springs, FL (US); Ahad M. Zadeh, Rochester, MI (US); Brian Hansen, Oxford, MI (US)

(73) Assignee: SCHROTH SAFETY PRODUCTS LLC, Pompano Beach, FL (US)

( * ) Notice: Subject to any disclaimer, the term of this patent is extended or adjusted under 35 U.S.C. 154(b) by 0 days.

(21) Appl. No.: 15/790,974

(22) Filed: Oct. 23, 2017

(65) Prior Publication Data

US 2019/0118753 A1   Apr. 25, 2019

Related U.S. Application Data

(63) Continuation of application No. 14/699,542, filed on Apr. 29, 2015, now Pat. No. 9,821,913.

(60) Provisional application No. 61/986,173, filed on Apr. 30, 2014.

(51) Int. Cl.
| | |
|---|---|
| *B60R 21/20* | (2011.01) |
| *B60K 35/00* | (2006.01) |
| *B60R 21/231* | (2011.01) |
| *B60R 21/00* | (2006.01) |

(52) U.S. Cl.
CPC ............ *B60R 21/20* (2013.01); *B60K 35/00* (2013.01); *B60R 21/231* (2013.01); *B60R 2021/0032* (2013.01); *B60R 2021/0044* (2013.01); *B60R 2021/0048* (2013.01); *B60R 2021/0093* (2013.01); *B64D 2201/00* (2013.01)

(58) Field of Classification Search
CPC .................. B60R 21/20; B60R 21/231; B60R 2021/0048; B60R 2021/0044; B60R 2021/0032; B60K 35/00
See application file for complete search history.

(56) References Cited

U.S. PATENT DOCUMENTS

| | | | | |
|---|---|---|---|---|
| 9,352,830 | B2 * | 5/2016 | Stamps | B64C 27/48 |
| 9,527,468 | B2 * | 12/2016 | Vasseur | B60R 21/216 |
| 9,821,913 | B1 * | 11/2017 | Deevey | B64D 11/06205 |
| 2006/0205302 | A1 * | 9/2006 | Woydick | B29C 66/1122 |
| | | | | 442/76 |
| 2013/0026803 | A1 * | 1/2013 | Islam | B60R 21/207 |
| | | | | 297/216.13 |
| 2013/0088056 | A1 * | 4/2013 | Quatanens | B60R 21/233 |
| | | | | 297/216.13 |
| 2014/0361521 | A1 * | 12/2014 | Fukawatase | B60R 21/231 |
| | | | | 280/730.1 |
| 2015/0232184 | A1 * | 8/2015 | Gehret | B64D 11/0621 |
| | | | | 244/121 |
| 2017/0225788 | A1 * | 8/2017 | Humbert | B60R 21/18 |

* cited by examiner

*Primary Examiner* — Darlene P Condra

(74) *Attorney, Agent, or Firm* — Trueba & Suarez PLLC; Roberto M. Suarez; William R. Trueba, Jr.

(57) ABSTRACT

A monument mounted airbag system for arresting passenger movement during a sudden acceleration/deceleration event of a moving vehicle includes an airbag assembly including at least one airbag on a first portion of a monument structure, the airbag assembly having a housing at least partially defined by a space between an external member and the monument structure.

11 Claims, 24 Drawing Sheets

MONUMENT MOUNTED AIRBAG

CLAIM OF PRIORITY

The present application is a continuation of, and claims priority to, U.S. patent application Ser. No. 14/699,542, now U.S. Pat. No. 9,821,913, which claims priority under 35 U.S.C. Section 119(e) to provisional patent application Ser. No. 61/986,173 with a filing date of Apr. 30, 2014, and which is incorporated herein by reference.

BACKGROUND OF THE INVENTION

Field of the Invention

The invention is directed toward a monument mounted airbag system as well as airbags for same.

Description of the Related Art

Disposing airbag assemblies within airplanes is generally known. Additionally, mechanisms for making bulkheads or other monument structures within airplanes safer are also generally known. One application includes a safety system for reducing the risk of injury during a survivable crash of a high-speed passenger vehicle including a bulkhead panel that is movable, compliant, and mounted to an energy absorbing means, such that force transfer between a passenger and the bulkhead may be reduced during crash events. However, the system does not teach, among other things, the use of an airbag assembly, and is therefore inapplicable to the present invention.

One airbag arrangement for bulkhead seats includes an airbag mounted on a bulkhead wall and configured to inflate in front of the seat occupant, in a direction generally downward toward the occupant's legs, such that the occupant, upon travelling forward under momentum, collides with the airbag. However, this airbag arrangement is also inapplicable to the present invention, as the present invention is configured for seating arrangements wherein at least a torso of the occupant is predicted to travel in a direction other than directly forward during a crash event, such as when the occupant is seated in a seat that is mounted at an angle relative to the direction of travel of the aircraft.

One structure mounted airbag assembly includes an airbag assembly having an airbag and housing or mounting structure, mounted forward of, and offset to one side of, or laterally offset from, the aircraft seat. Additionally, the airbag is configured to deploy from a position offset from the seat, toward the seat, at an angle thereto. Such a configuration, however, has several deficiencies, which are addressed by the present invention. For example, the airbag is configured to deploy toward the seat. In scenarios where the passenger deviates from a predetermined path of travel during a crash event, the airbag is substantially likely to fail to receive and arrest the passenger.

SUMMARY OF THE INVENTION

Typical first or business class sections of commercial airplanes may include partitions between seats or groups of seats for enhanced privacy between passengers. Such partitions, or monuments as they may be referred to, are typically rigid structures, mounted to the floor and/or or interior wall of the aircraft. Additionally, seats within first or business class sections may be mounted at an angle relative to the direction of travel of the aircraft, as opposed to facing the front of the aircraft, in order to increase useable space between the seats. Accordingly, some monuments must be designed to somewhat conform to, or otherwise circumscribe the angled seat and can result in curved or other irregular surfaces. Current safety standards limit the available space between seat and adjacent monument, as it would be undesirable for a passenger to collide with an adjacent monument. Therefore, if an airbag were to be mounted in protective relation between the passenger and monument, space restrictions may be decreased and more seats may be installed, among other benefits. However, the irregular shape of most monuments has proven a challenge to efficiently mounting an airbag in protective relation to a passenger and the adjacent monument. The present invention addresses these and other concerns present in the field.

It is accordingly an object of the present invention to provide an efficient airbag system to receive and arrest passengers seated in such angled seats during sudden accelerations experienced during, for example, abrupt stops or crashes. In the event of such a sudden acceleration, passengers will generally experience a tendency to continue along the direction of travel under their own momentum. Accordingly, when the vehicle experiences a frontal collision, as is likely, the direction of travel of the passenger will likely be askew from the seat, and likely toward a monument. The invention is deployed to intercept the passenger along this predetermined path of travel to receive and arrest the passenger, prior to collision with the monument. As used herein, the term acceleration is intended to encompass any change in speed or direction, and include the definition of the commonly used term "deceleration."

One aspect of the present invention is an airbag which can be utilized in conjunction with the monument mounted airbag system. The main body of the airbag may be partially defined by an outer surface of material exhibiting suitable qualities such as strength, flexibility, and permeability which will be discussed further below. The main body may also be configured to assume a substantially oblong shape when fully inflated, or fully deployed. Additionally the oblong shape of the main body may further comprise a curved configuration along a central axis thereof, such that the main body can conform to a correspondingly curved monument.

Additionally, the airbag may contain at least one of a plurality of distinct portions or supports that may be integrally formed with the surface of the airbag. For example it may be desirable to include a lower support portion disposed to intercept a torso of the passenger. Thus, the lower support may be dimensioned to protrude away from the main body such that the torso of the passenger collides with the lower support prior to, or substantially concurrently with, a head of the passenger colliding with, e.g., the main body. Thusly configured, the lower support may provide an initial force on the passenger's torso, decreasing the rate of travel of the passenger, prior to the passenger's head contacting the main body. Additionally, the lower support may serve to spread the arresting force of the airbag across a larger surface area, decreasing pressure and stress applied to the head and/or neck. Lastly, the lower support may contribute to a substantially safer posture of the passenger during arrest. All of the above features will substantially decrease the chance of head and/or neck injury caused by the arresting force of the airbag and/or monument.

The main body may also include a side support configured to protrude from and end of the main body. In one embodiment, the side support may comprise a substantially vertically oriented portion of the main body that protrudes therefrom. When disposed on a distal end of the main body, the side support may form a cradle or crevice which can provide a retaining support for the head and/or neck portion of the passenger. As such, the head and/or neck portion is prevented from sliding off or glancing away from the main body.

In another embodiment, the side support may comprise a suitably dimensioned appendage to the main body and be disposed so as to protect the passenger from colliding with objects or surfaces within a range of motion but not necessarily encompassed by the main body. For example, one embodiment of the side support may comprise a substantially longitudinal appendage disposed on a proximal end of the main body and configured and disposed to deploy in protective relation to the passenger across a display mounted to the monument. As such the side support may be configured and disposed to project across the display, between the display and the passenger, when the airbag is deployed.

Additional features of the present invention include a monument mounted airbag system which presents several distinct advantages. To begin, the system of the present invention is very compact as it can utilize existing spaces as housing. For example, in many monuments disposed in aircraft, external members are mounted to the monument, in spaced relation thereto. In some embodiments an external member can comprise a display screen for provision of in-flight entertainment and information to the passenger. Alternatively, the external member may comprise a façade. In either embodiment, a substantial portion of the system may be disposed in the space between the external member and the monument, thereby utilizing same as a housing, rather than containing all components of the system within a separate structure. Thusly disposed, it should be understood that it would be desirable to dispose a portion of the system, namely the portion from which the airbag deploys, with sufficient clearance from the external member so as to avoid obstacles to the deployment of the airbag. However other components, such as inflators, sensors, power supplies, to the extent that they are not shared with other airbag systems, may be disposed substantially behind the external member, at least in relation to the passenger.

Yet another feature of the system of the present invention is directed to embodiments of the invention wherein the passenger's seat is aligned at an angle to the direction of travel of the aircraft. In such an embodiment the system may be disposed directly forward of the passenger and/or seat, as in embodiments where a substantial portion of the system is mounted behind a monument mounted external member. As such, the airbag deploys from a position directly forward of the passenger and/or seat. However, it is likely that, during a rapid acceleration of the aircraft, the passenger will travel along the path of travel of the aircraft, as in the case of a frontal collision. Thus, the passenger will not travel toward the initial deployment point of the airbag, but rather on a non-converging path, such as to the side. As such, the airbag may be configured to deploy in a direction away from the passenger and/or seat so as to intercept the path of travel of the passenger. It is also desirable that the airbag intercept the path of travel of the passenger at a point in time before the passenger arrives, so as to allow for substantial inflation and/or deployment of the airbag prior to collision of the passenger with the airbag, thereby maximizing the arresting potential of the airbag.

Additionally, in such forward-deploy embodiments, it may also be desirable to include an airbag with an at least partially curved configuration. As such, an at least partially curved configuration can increase the ability of the airbag to receive and arrest the passenger, even when the passenger deviates from the predetermined path of travel, as in the case of an askew crash, where impact comes from a direction other than directly in front of the aircraft. Furthermore, the curve of the airbag may be dimensioned so as to allow the airbag, or some portion of it, such as the main body, to substantially conform to a monument surface of which it is predicted that the passenger may collide with, thus further increasing the ability of the airbag to receive and arrest the passenger.

In at least one embodiment the system of the present invention also includes an airbag containment member structured and configured to contain the airbag in a pre-deployed state, as well as guide the airbag during initial deployment. As such, it is desirable for the airbag containment member to comprise a rigid, durable material and be substantially hollow in construction, thereby providing a cavity in which to store the airbag in the pre-deployed state. Additionally, the airbag containment member may include an aperture which the airbag may deploy through, and which may be oriented to guide the airbag in the desired direction during initial deployment. A cover may be affixed to the aperture in order to partially disguise the or otherwise mask the appearance of the system to a passenger. Furthermore, at least a portion of the airbag containment member may be dimensioned and configured to substantially conform to a portion of the monument, in order to facilitate a compact mounting of the system of the present invention.

Lastly, presently known methods of constructing airbags, such as those intended for automotive use, do not conform to FAA flammability regulations. Thus it may be desirable to construct the surface of the airbag out of such materials and coatings as will conform to FAA flammability requirements. Such a material may comprise, for example, a polyester fiber substrate treated with a phosphate-phosphonate compound having a low volatility and a high phosphorous content, heat set, and further coated with a polyurethane that may include a 1:3 flame retardant mixture of antimonytrioxide:1,1'-(ethane-1,3-diyl)bis[pentabromobenzene]. Such a material also provides sufficient permeability characteristics so as to allow the airbag to maintain sufficient pressure.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The depicted embodiments generally include a seat 2000 that is disposed at an angle relative to the direction of travel of the vehicle. Accordingly, as a frontal collision is likely, the seat 2000 is also disposed at an angle relative to a predetermined path of travel of the passenger 5000, depicted in FIG. 5 via a dashed arrow. Additionally, the depicted embodiments include a monument 1000 that is disposed and configured in an at least partially curved configuration. An external member 4000 is mounted in spaced relation to a first portion 1010 of the monument 1000 that is directly forward of the passenger 2000. It will be appreciated, however, that the principles disclosed herein may be equally application to myriad other configurations and arrangements.

Additionally, the following Figures depict a crash event or other sudden acceleration wherein the passenger 3000 travels along a predetermined path under its own momentum. As such, the following figures depict the relevant stages of the event from various views beginning with a pre-deployed state and ending with the receipt and arrest of the passenger 3000 by the system 1.

With reference to FIGS. 1 through 4, the monument mounted airbag system 1 of the present invention and one embodiment of its intended use and operating environment are depicted. The depicted embodiment comprises an aircraft interior, or other suitable vehicle, such as a ship, bus, train, or the like, including a seat 2000, passenger seated in the seat 3000, and monument 1000 disposed in proximity thereto. The monument 1000 includes a first portion 1010 and a second portion 1020, the first portion 1010 comprising the general area of the monument 1000 which the passenger 3000 faces when seated, the second portion 1020 comprising the general area of the monument 1000 disposed to the side of the passenger 3000 while seated.

Additionally an external member 4000 is mounted in spaced relation to the first portion 1010. Such an external member 4000 might comprise a display screen, such as LED or LCD, of the type to provide in-transit entertainment or information. Additionally the external member 4000 might also comprise a façade to provide a space between the external member 4000 and monument 1000. In any embodiment, however, the external member 4000 serves to create an at least partially enclosed space between the external member 4000 and the monument 1000 which can be utilized as a housing 200 for at least a portion of the system 1.

Figure 1:
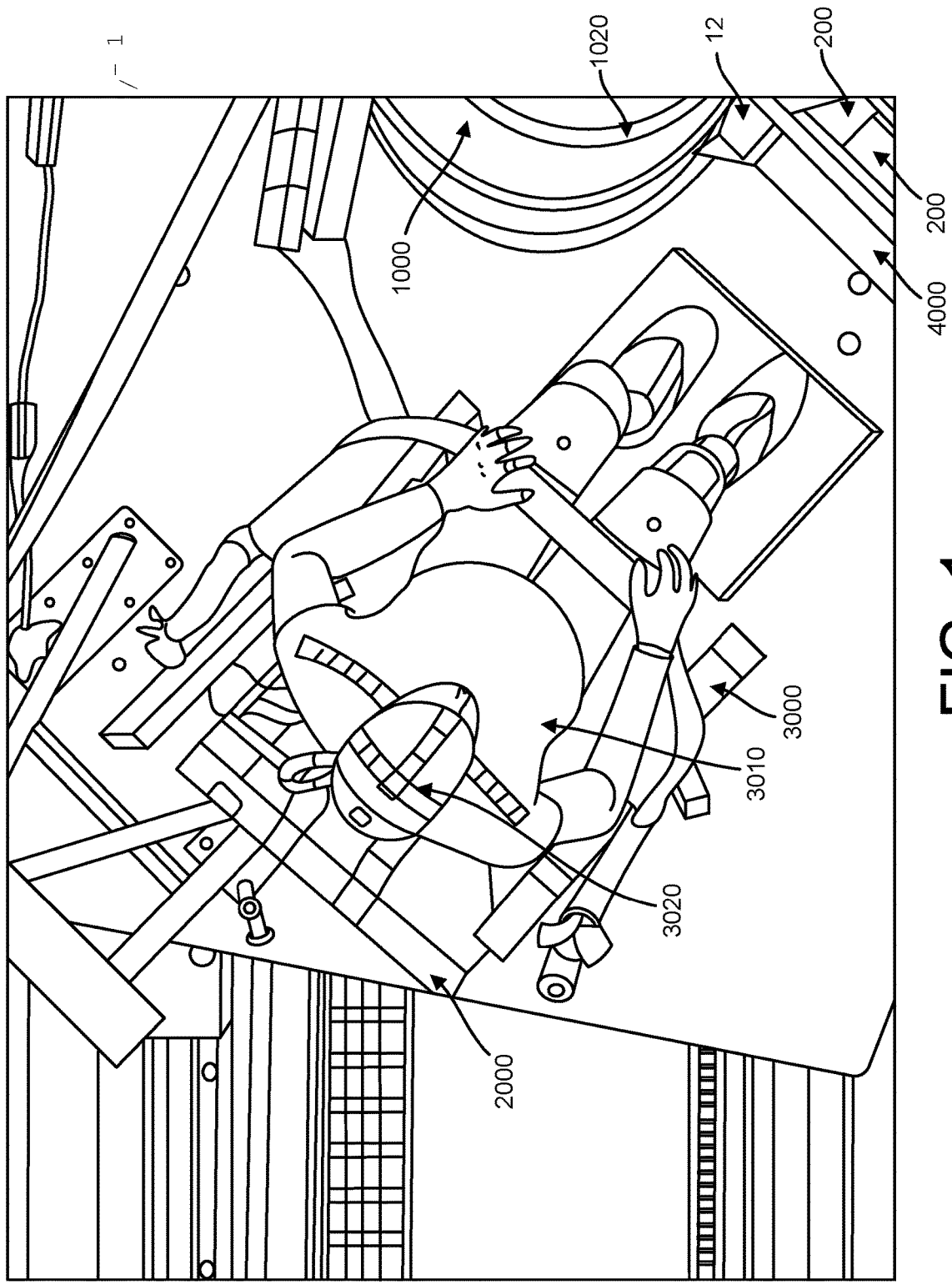
FIG. 1 is a top perspective view of a monument mounted airbag system in a pre-deployed state according to one embodiment of the present invention.
Figure 2:
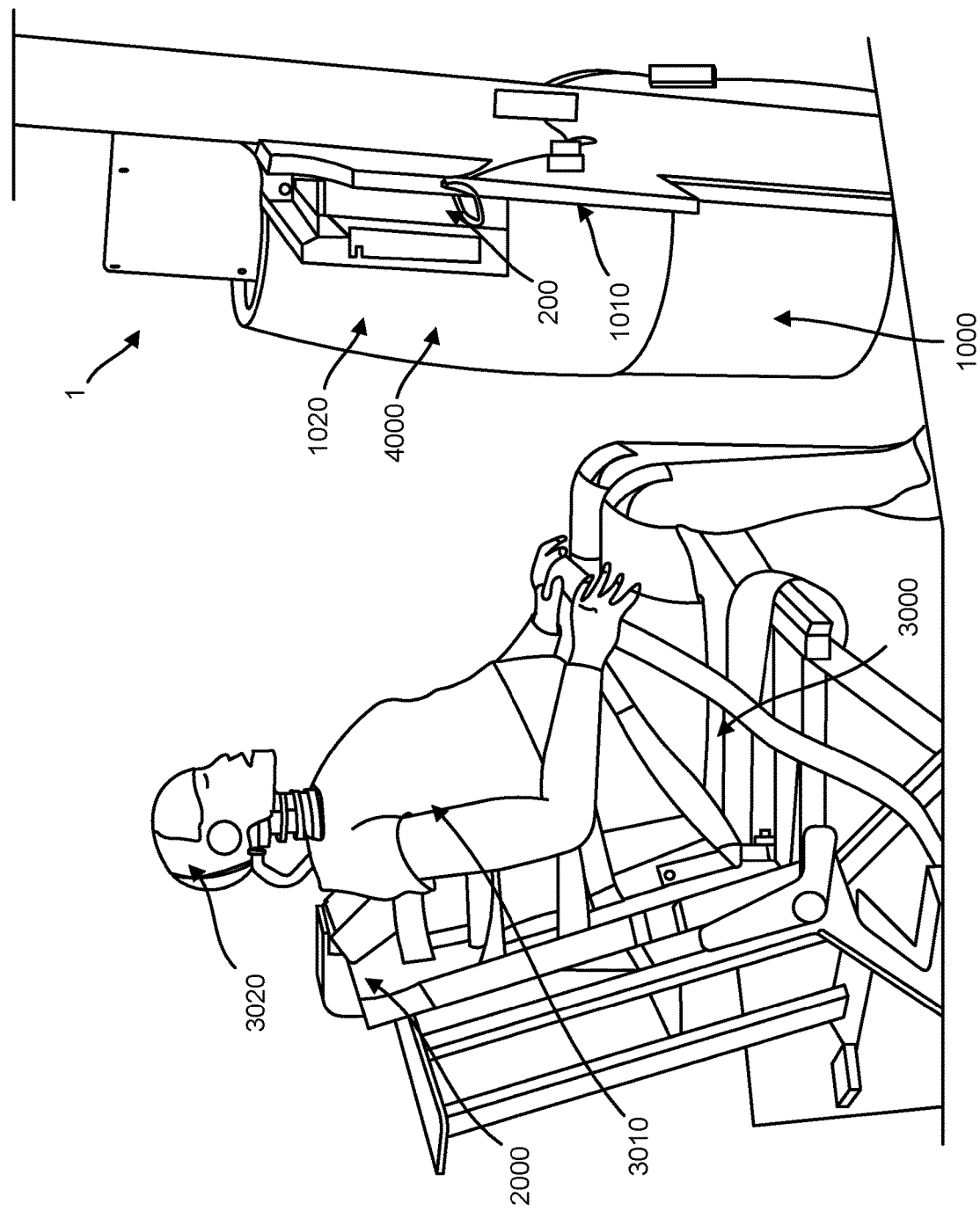
FIG. 2 is a side perspective view of a monument mounted airbag system in a pre-deployed state according to one embodiment of the present invention.
Figure 3:
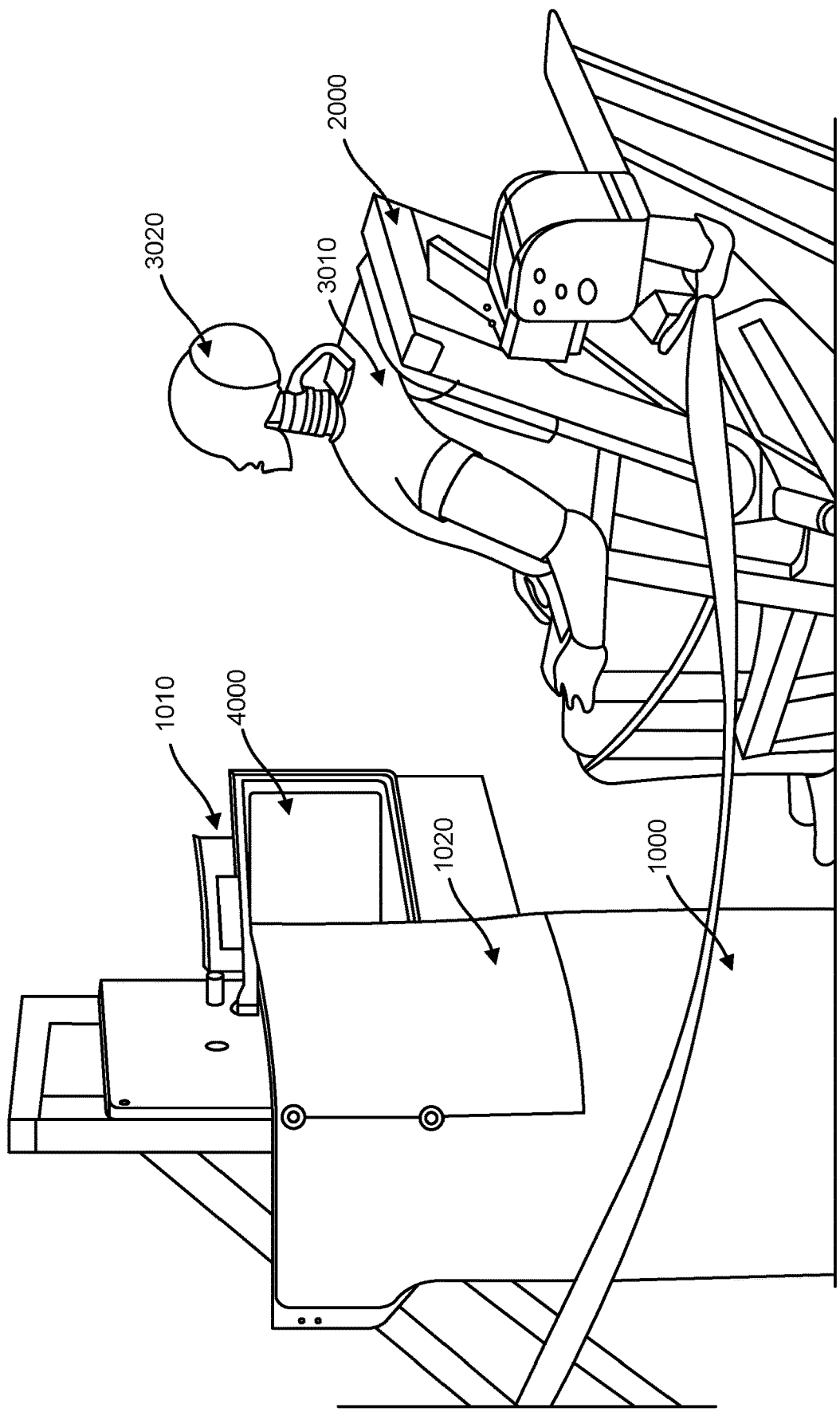
FIG. 3 is a side perspective view of a monument mounted airbag system in a pre-deployed state according to one embodiment of the present invention.
Figure 4:
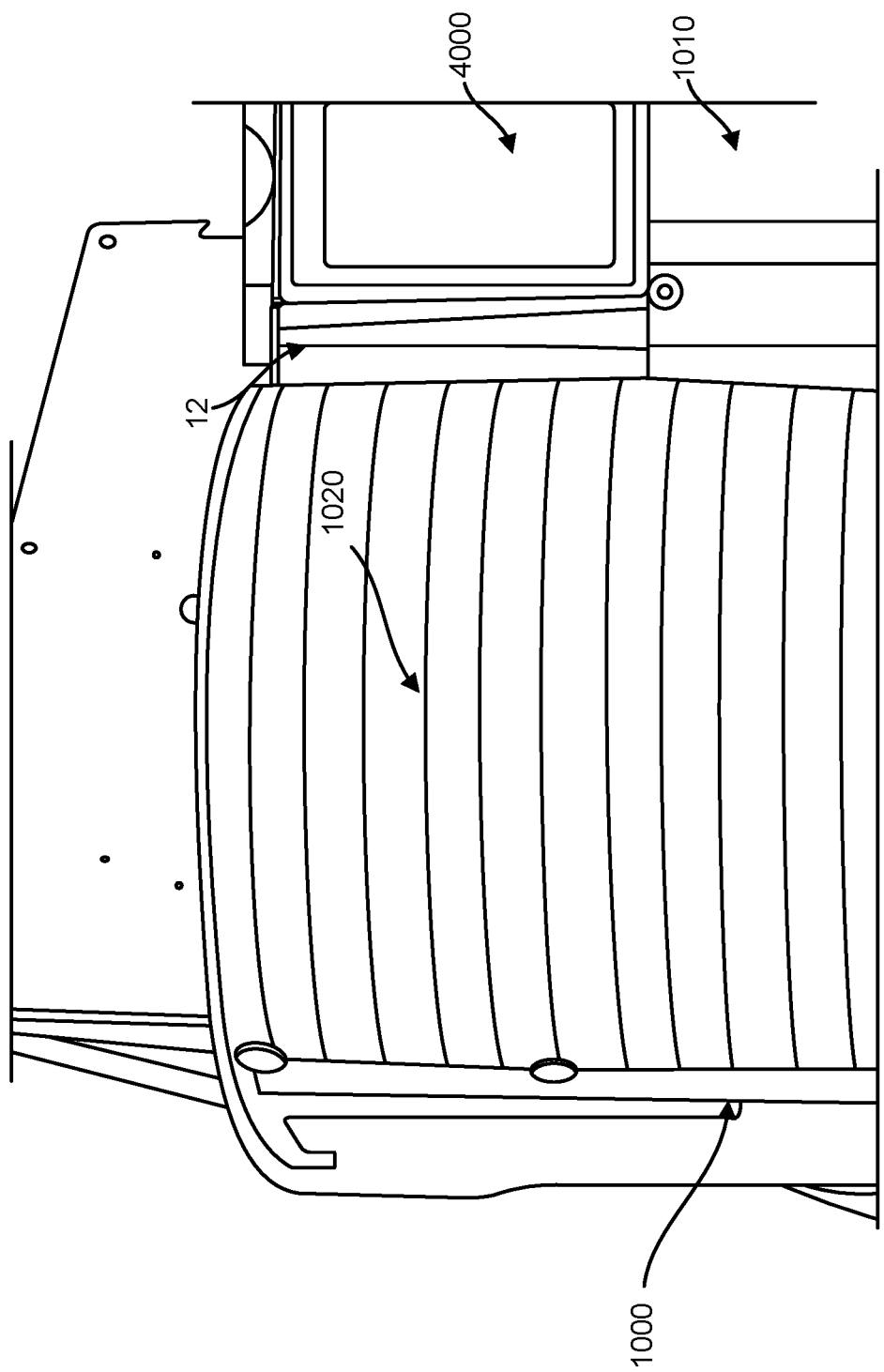
FIG. 4 is a front partial perspective view of a monument mounted airbag system in a pre-deployed state according to one embodiment of the present invention.

Furthermore, as can particularly be seen in FIG. 4, a removable cover 12 may be included so as to further camouflage the system 1, or portions thereof, from a passenger, without creating obstacles to deployment of the system 1, as will be described.

Figure 5:
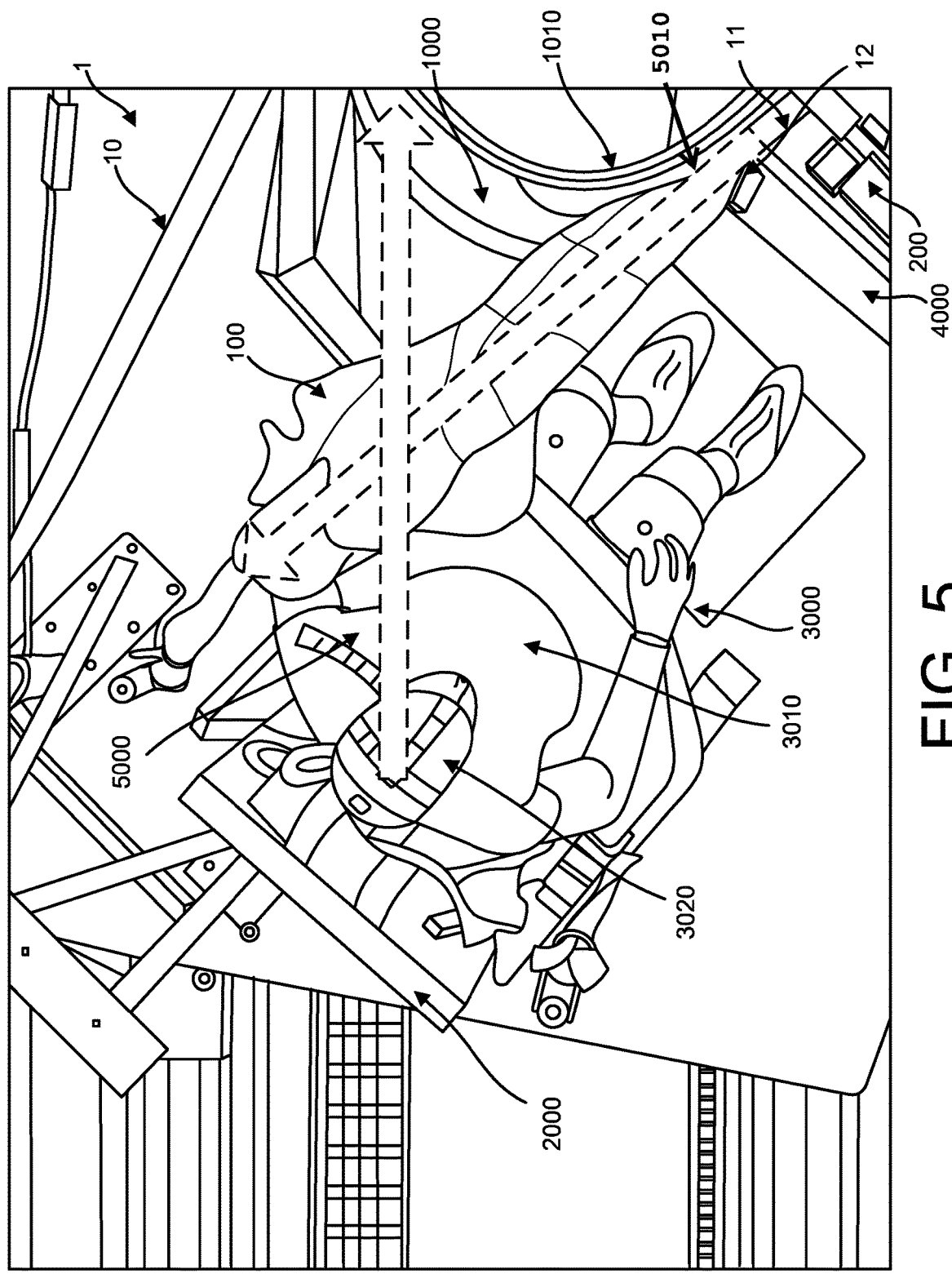
FIG. 5 is a top perspective view of a monument mounted airbag system during deployment according to one embodiment of the present invention.
Figure 6:
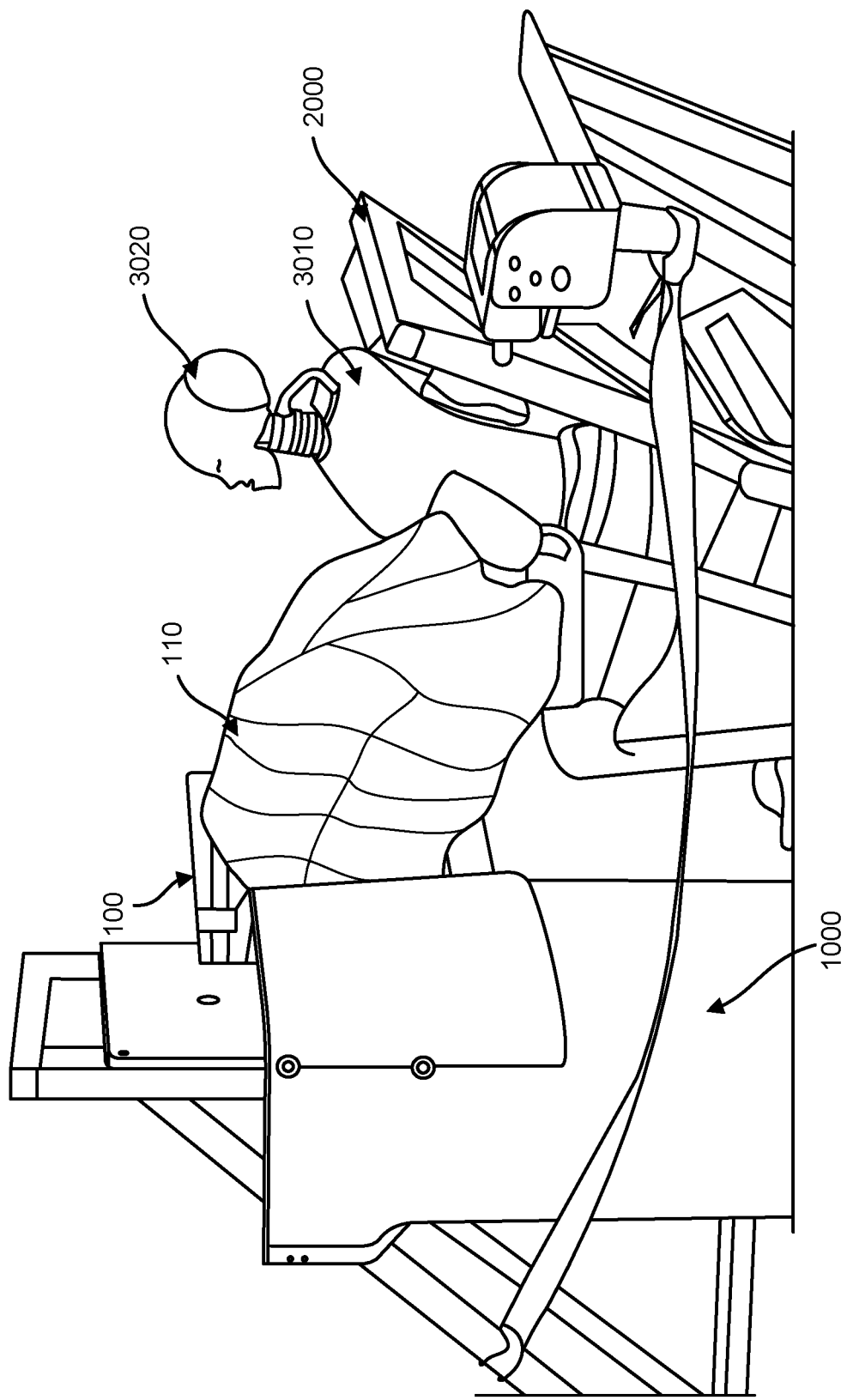
FIG. 6 is a side perspective view of a monument mounted airbag system during deployment according to one embodiment of the present invention.
Figure 7:
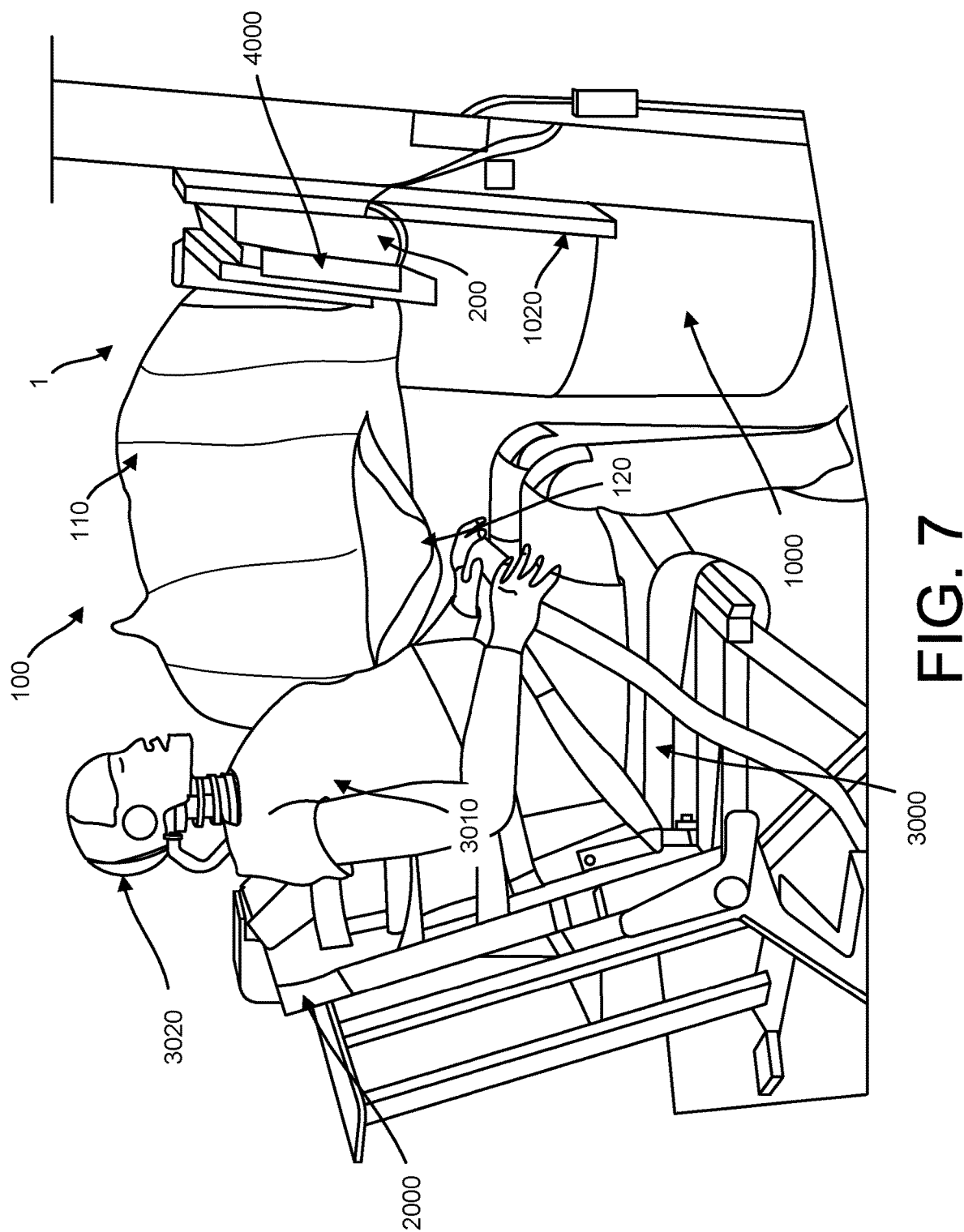
FIG. 7 is a side perspective view of a monument mounted airbag system during deployment according to one embodiment of the present invention.

Now with reference to FIGS. 5 through 7, the system 1 is depicted in a semi-deployed state, wherein an airbag 100 of the system is ejected from its pre-deployed state within an airbag containment member 11 in response to one or more predetermined conditions, such as a crash event, or other sudden acceleration. Accordingly, as a result of the predetermined condition, the passenger 3000 has begun traveling along a predetermined path 5000, as will be discussed below. Additionally, the cover 12 has pivoted to an open configuration, allowing the airbag 100 to pass substantially unimpeded.

As can be seen, the initial momentum of the airbag 100 carries it in a direction at least partially away from the passenger 3000, from its initial position within the airbag containment member 11, which is substantially in front of the passenger, as indicated by the dashed arrow tracing the initial deployment path of the airbag 5010 in FIG. 5. Additionally depicted in FIG. 5 is another dashed arrow tracing the predetermined path of travel of the passenger 5000. Note that as the seat 2000 is oriented at an angle relative to the path of travel of the aircraft, the passenger 3000 is not predicted to travel directly forward, i.e., towards the external member 4000, but rather, the passenger's momentum will carry it along the path of travel of the aircraft. In the depicted embodiment, the predetermined path of travel of the passenger 5000 is generally toward the second portion 1020 of the monument 1000.

As such, and as can be particularly seen in FIG. 5, the system 1 is configured to deploy the airbag 100 from a position directly or substantially in front of the passenger 3000, in a direction away from the passenger 3000 along an intercept course with a predetermined path of travel of the passenger 5000, thus ensuring the receipt and arrest of the passenger 3000 along a wide range of motion, and also in scenarios where the passenger 3000 deviates from the predetermined path of travel 5000.

Figure 8:
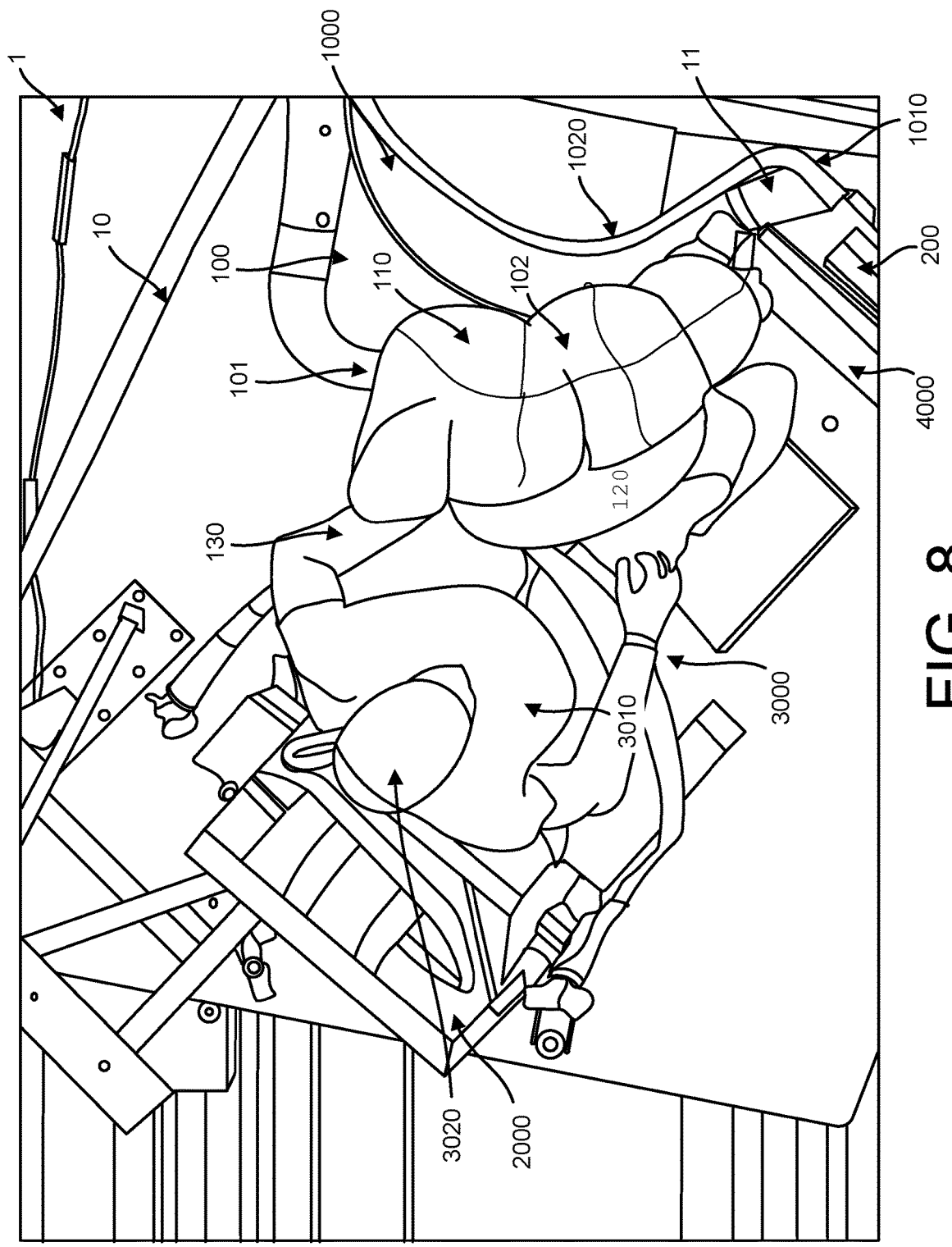
FIG. 8 is a top perspective view of a monument mounted airbag system fully deployed according to one embodiment of the present invention.
Figure 9:
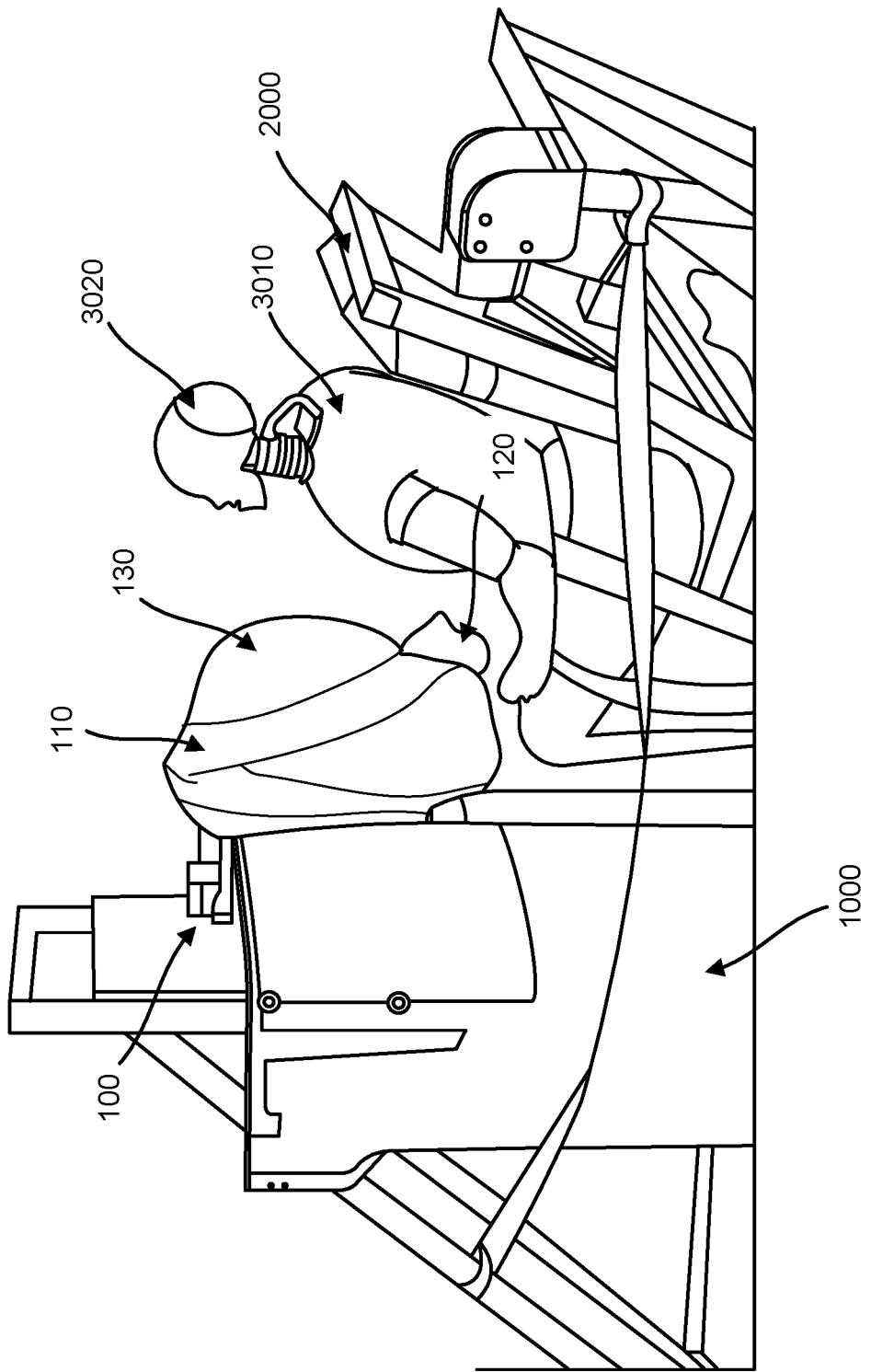
FIG. 9 is a side perspective view of a monument mounted airbag system fully deployed according to one embodiment of the present invention.
Figure 10:
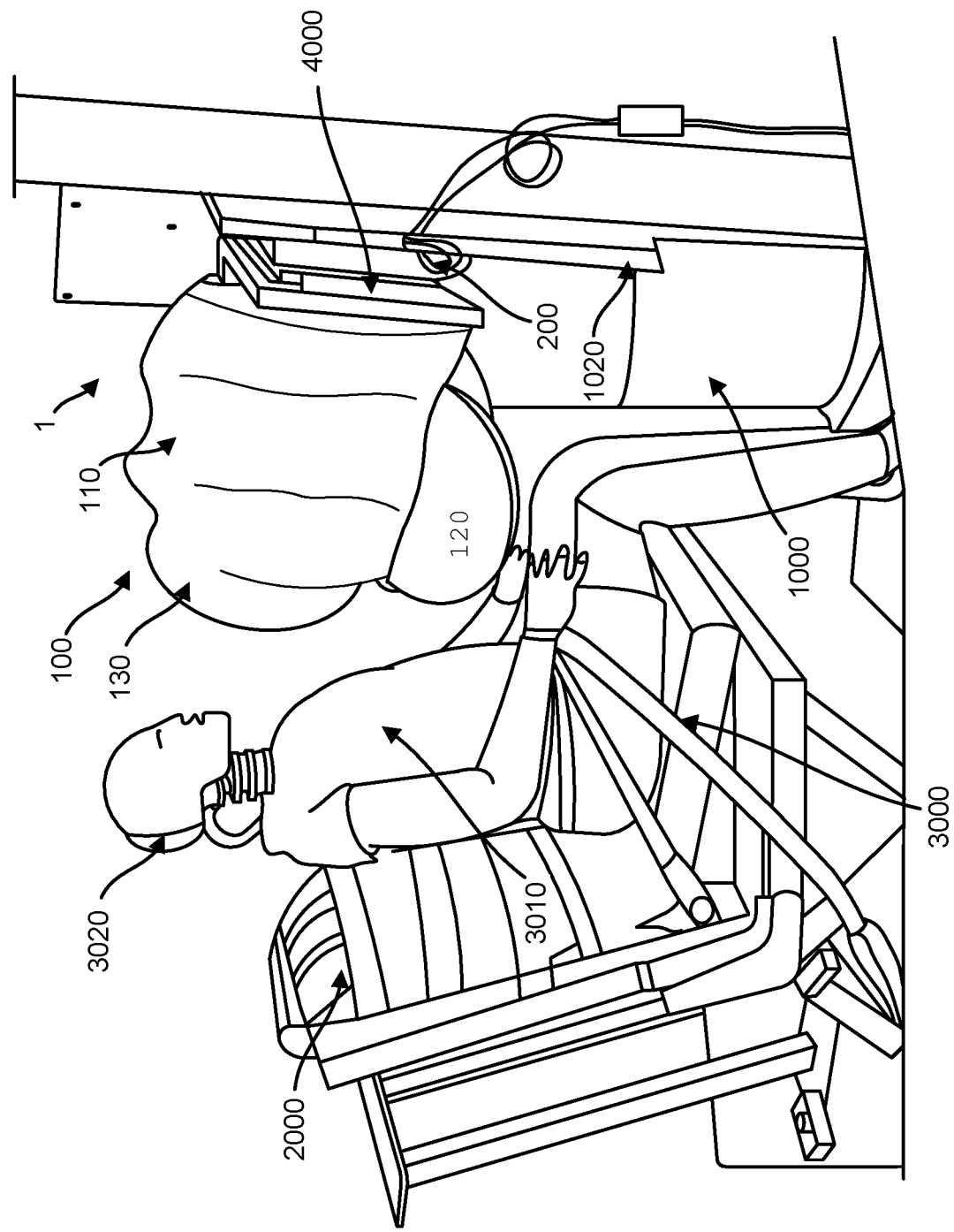
FIG. 10 is a side perspective view of a monument mounted airbag system fully deployed according to one embodiment of the present invention.
Figure 11:
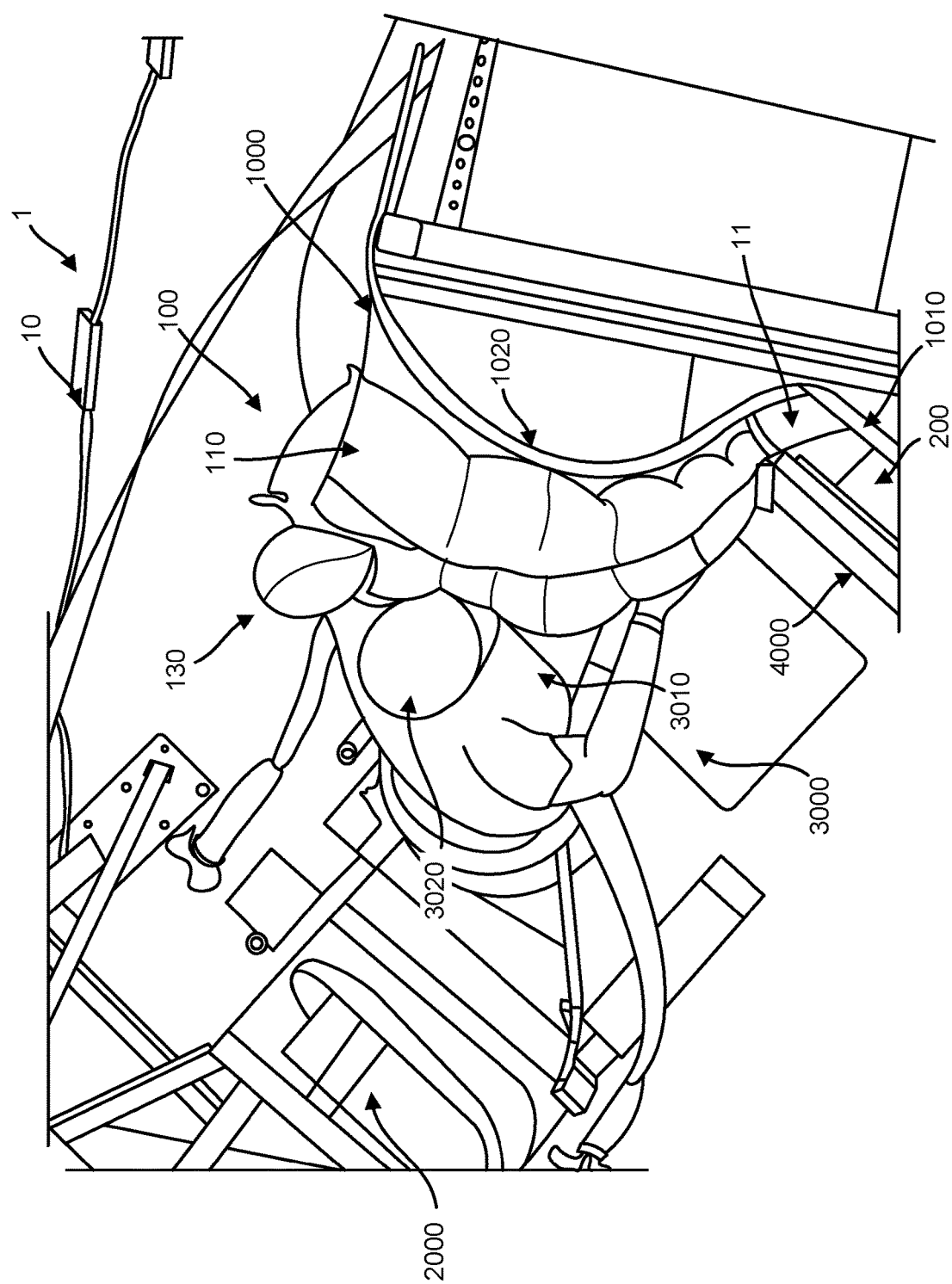
FIG. 11 is a top perspective view of a monument mounted airbag system in a passenger receiving configuration according to one embodiment of the present invention.
Figure 12:
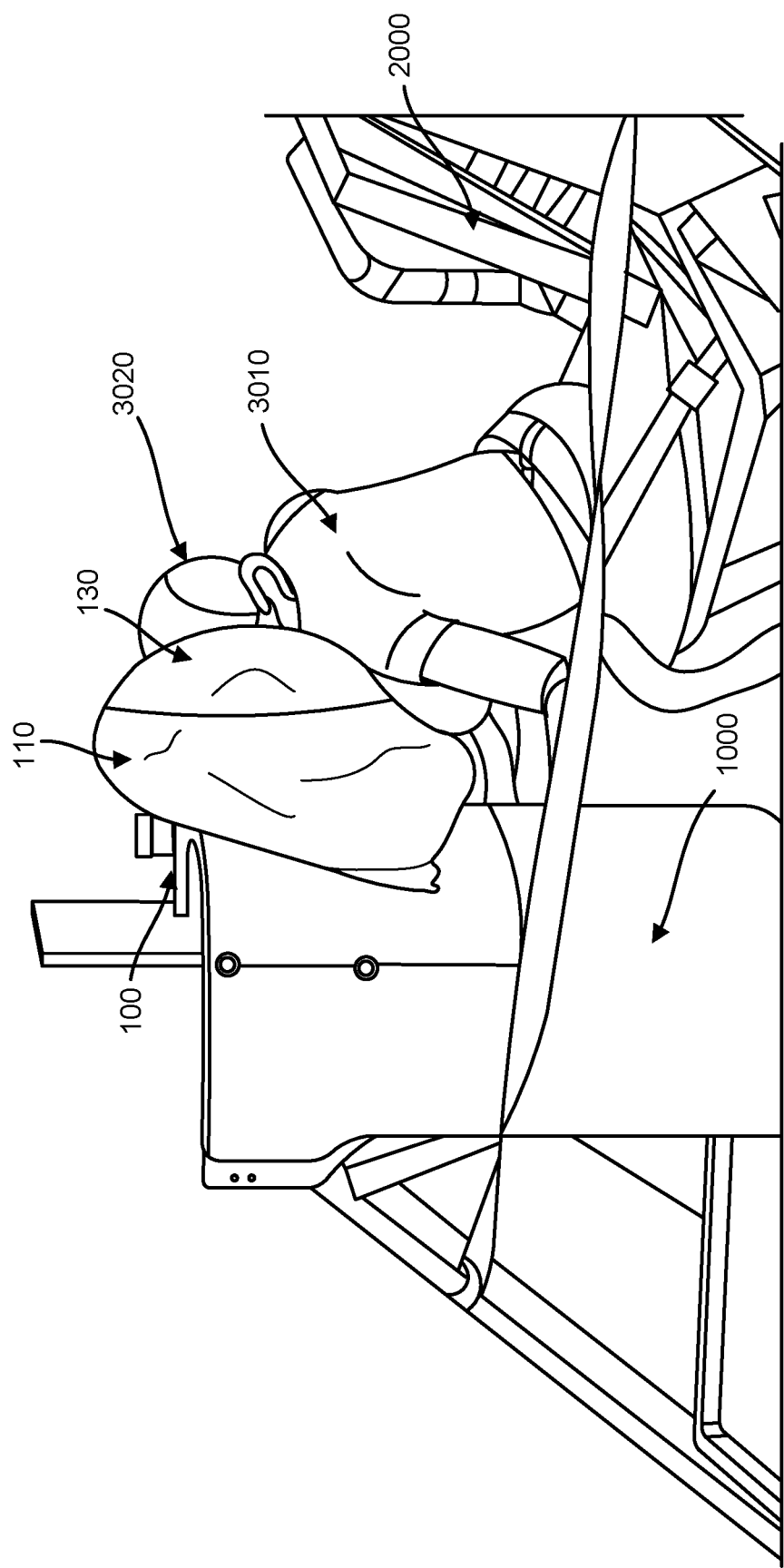
FIG. 12 is a side perspective view of a monument mounted airbag system in a passenger receiving configuration according to one embodiment of the present invention.
Figure 13:
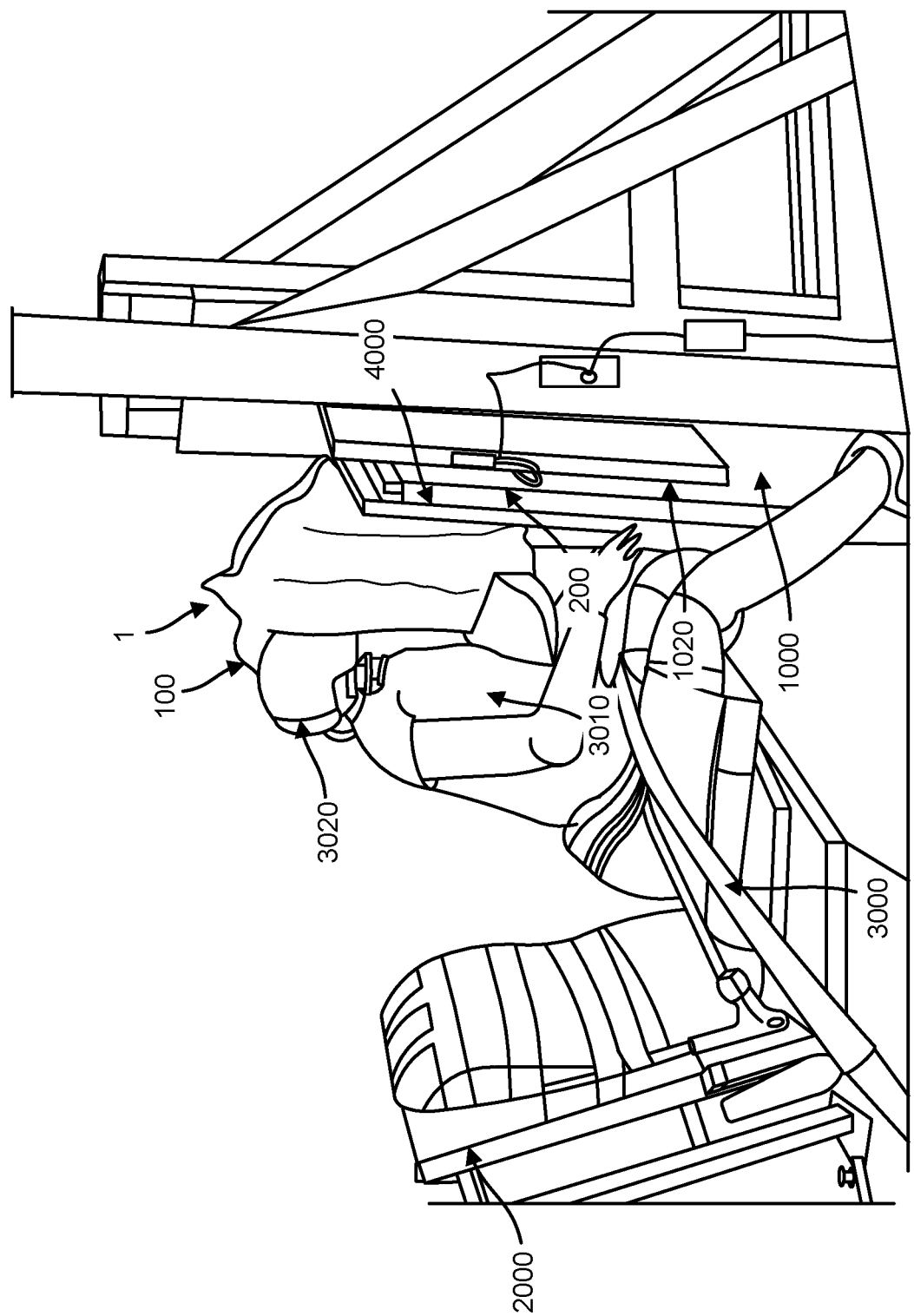
FIG. 13 is a side perspective view of a monument mounted airbag system in a passenger receiving configuration according to one embodiment of the present invention.

Now with reference to FIGS. 8 through 10, the system 1 is depicted in a fully deployed state, and the passenger is continuing to travel along the predetermined path 5000 outlined above. As the airbag 100 is now fully inflated, discussion thereof should be had. In certain embodiments, the airbag 100 includes a surface 101 comprised of material of sufficient strength, impermeability, and inflammability as required to meet at least given airbag regulations. The surface 101 is joined in such a configuration so as to form at least a main body 110 capable of retaining a predetermined volume of gas to be injected into the airbag 100 in accordance with a predetermined event, such as a crash event or other sudden acceleration.

The main body 110 may be comprised of a plurality of sub-portions, each in fluid communication with one another. The main body 110 may also include a plurality of internal tethering, or portions of the surface 101 that are joined internally, such as by stitching together. As such, the main body 110 may be given a distinct shape or configuration as desired or required by the operating environment. In the depicted embodiment, the main body 110 is configured to include a substantially curved configuration as evidenced by the curvature of the seam 102 along the main body 110. The curved configuration can contribute to an at least partially conforming relation to the second portion 1020 of the monument, thereby increasing the ability for the system 1 to receive and arrest the passenger 3000. Such a curved configuration may be accomplished, for example, by constructing one half of the main body 110 to be larger than the other half of the main body 110. Such a configuration may also be supplemented with tethers as desired.

The airbag 100 may also include other portions, which may be unitarily formed or otherwise integrated with the surface 101 of the airbag 100, including but not limited to, side support 130 and lower support 120. The lower support 120, in various embodiments, is disposed and configured to initially intercept a torso portion 3010 of the passenger and apply an arresting force there, thereby reducing the likelihood of a head and/or neck injury to the passenger 3000. This mechanism will be disclosed further in the following Figures. Additionally, the side support 130, in various embodiments, is disposed and configured to cradle and/or otherwise prevent the head portion 3020 from traveling off of the airbag 100 and/or into any surrounding environmental features. Likewise, this mechanism will be disclosed in further detail in the following Figures.

Now with reference to FIGS. 11 through 14, the passenger 3000 has continued along the predetermined path of travel 5000, as detailed above, and has made contact with the airbag 100 via the torso portion 3010 contacting the lower support 120 and the head portion 3020 contacting the main body 110. As can be seen the torso portion 3010 is in contact the lower support 120 which provides an auxiliary region of support for the arresting force of the system 1, thereby relieving the head and/or neck of the passenger 3000 of substantial stress. Additionally, the lower support 120 maintains the passenger 3000 at such an angle so as to avoid neck injuries. Additionally, as can also be seen, the main body 110 has now substantially conformed to the second portion 1020 of the monument 1000.

Figure 14:
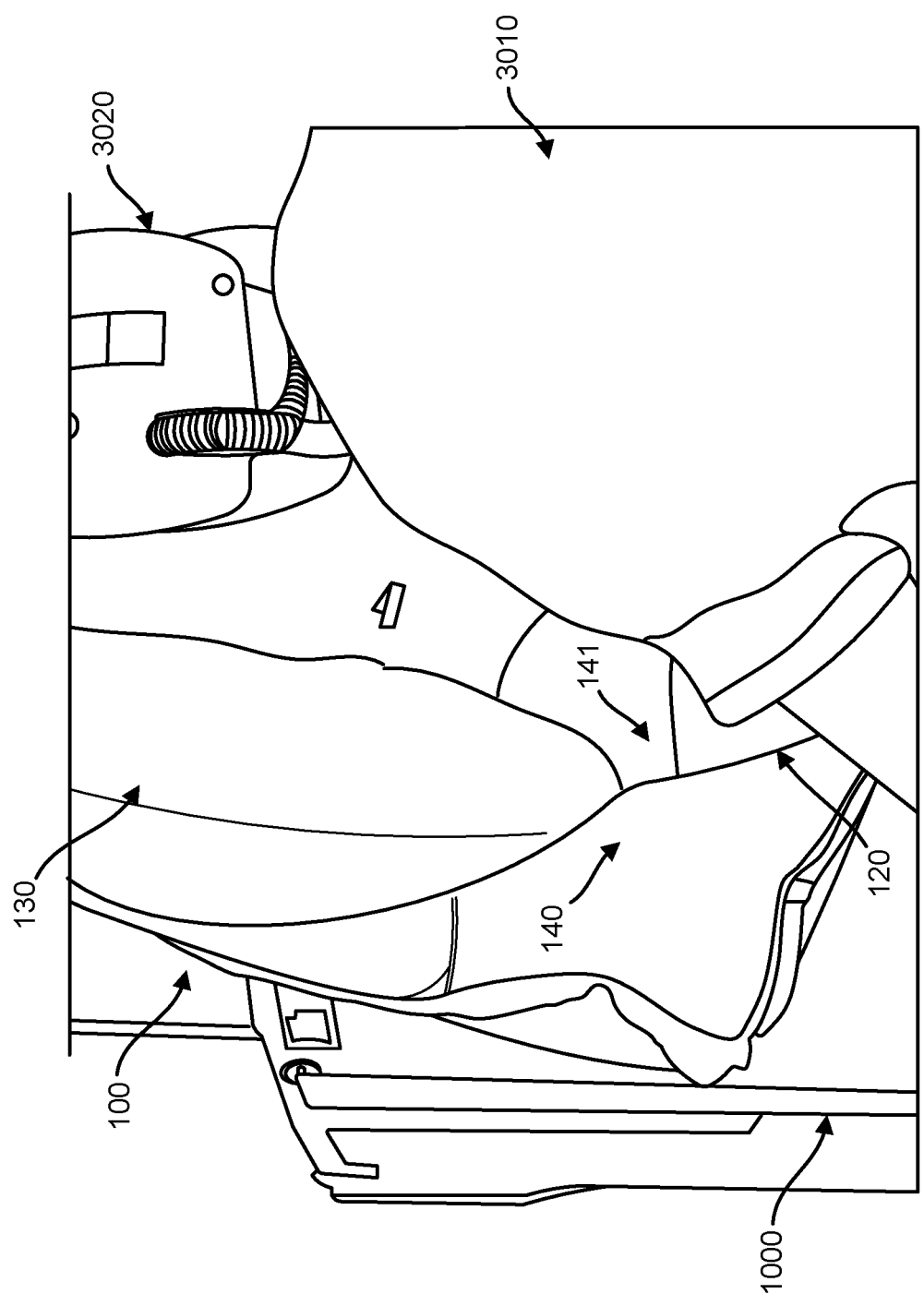
FIG. 14 is a front partial perspective view of a monument mounted airbag system in a passenger receiving configuration according to one embodiment of the present invention.
Figure 15:
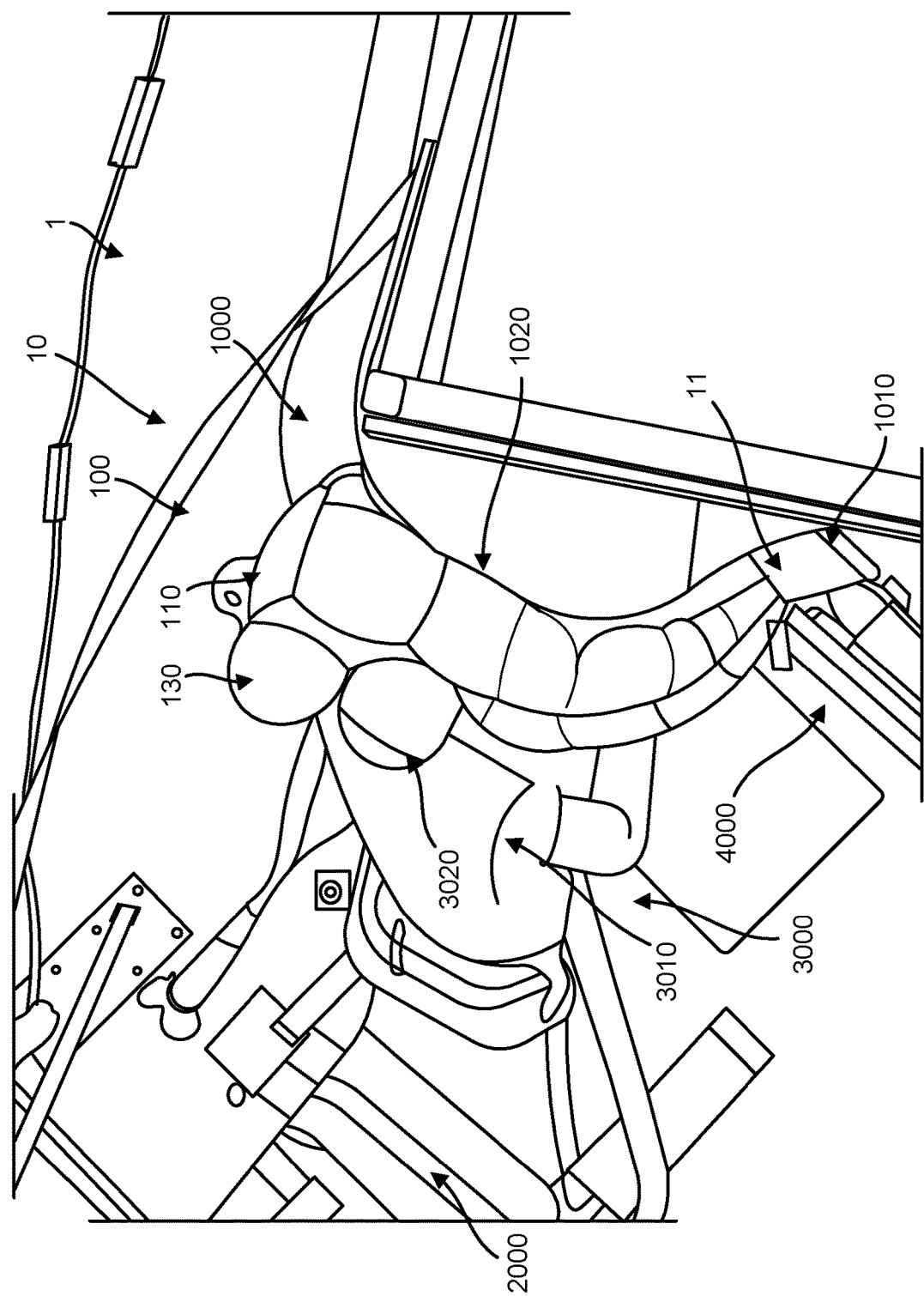
FIG. 15 is a top perspective view of a monument mounted airbag system during deployment of an active vent thereof according to one embodiment of the present invention.
Figure 16:
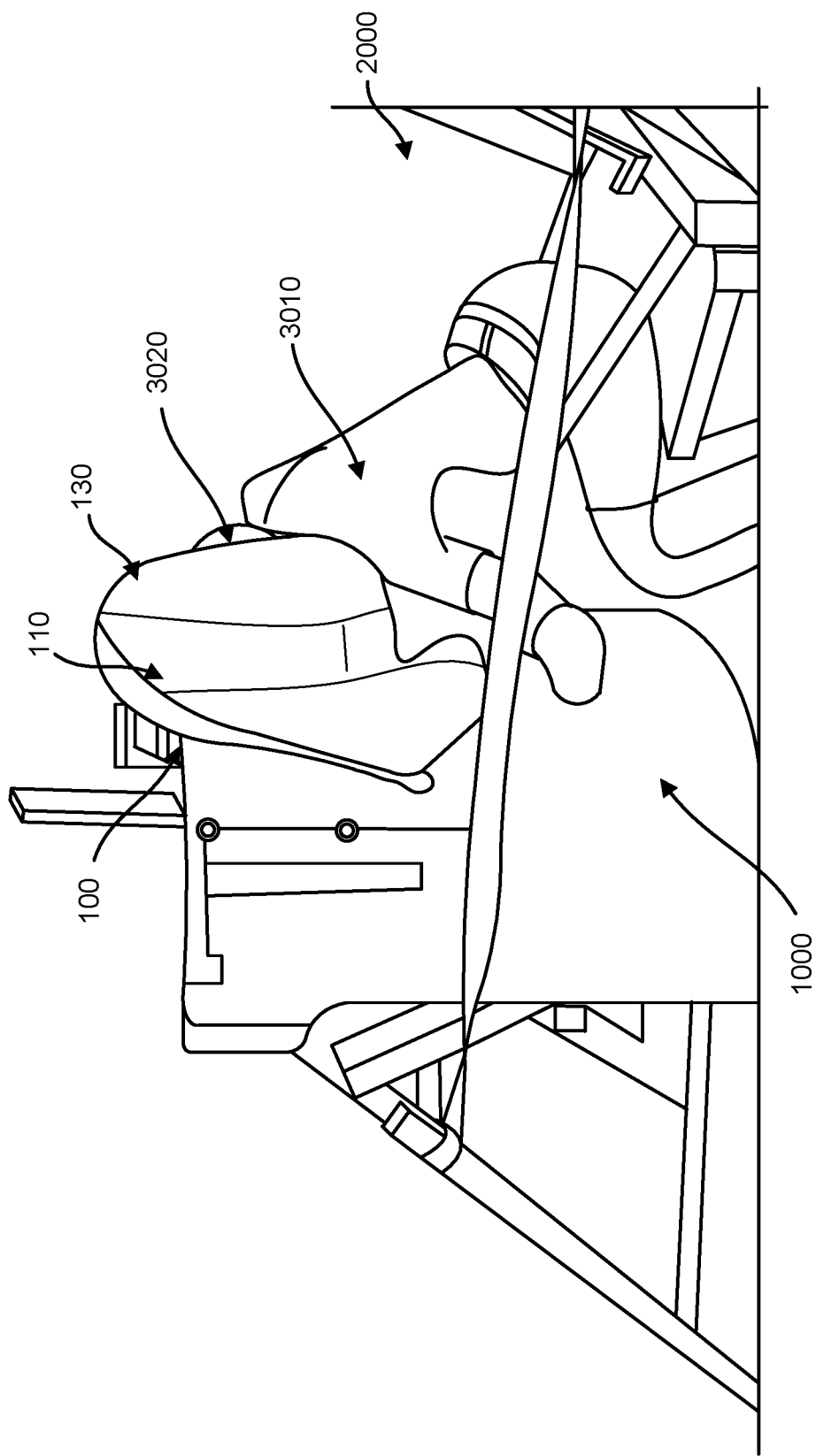
FIG. 16 is a side perspective view of a monument mounted airbag system during deployment of an active vent thereof according to one embodiment of the present invention.
Figure 17:
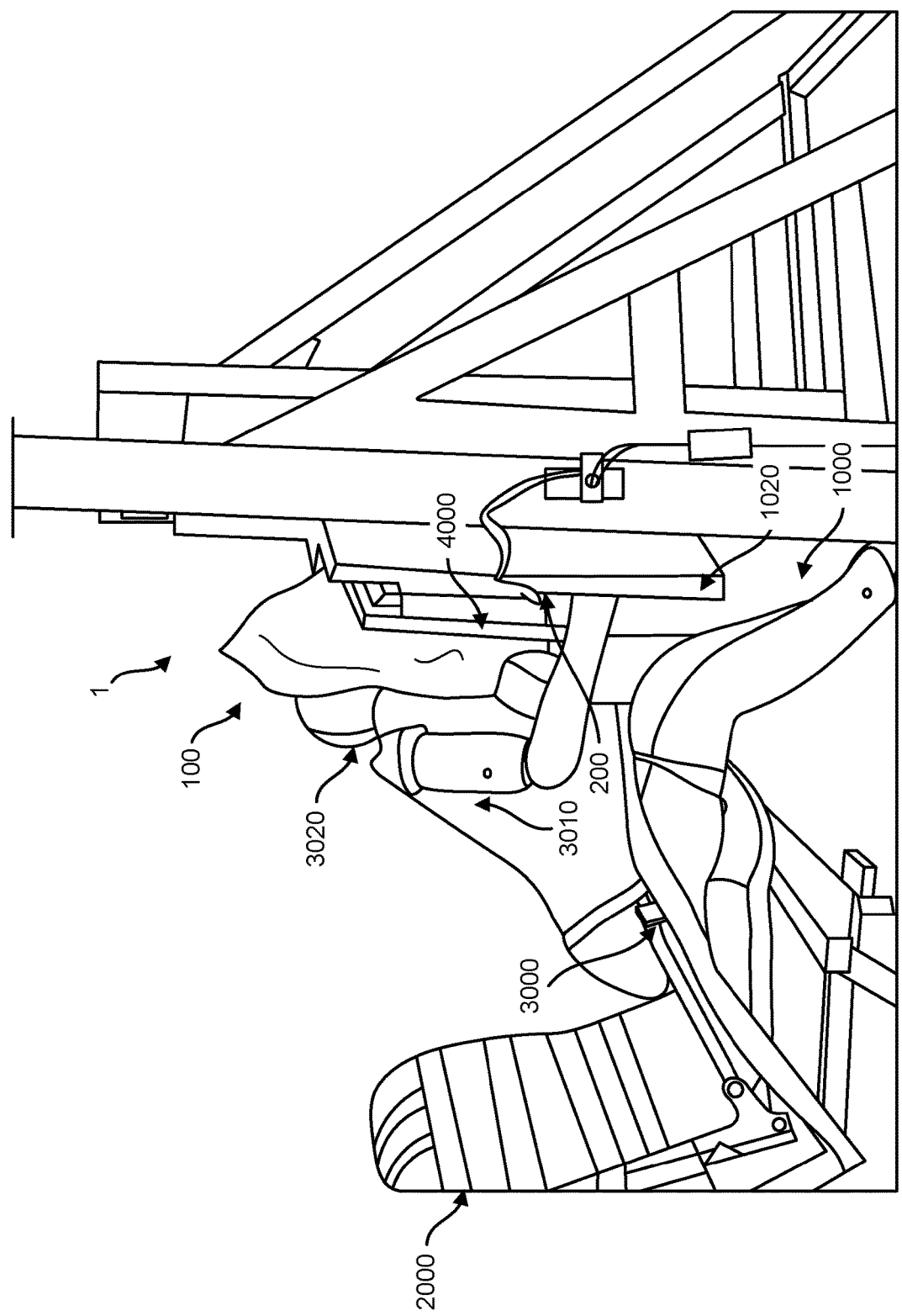
FIG. 17 is a side perspective view of a monument mounted airbag system during deployment of an active vent thereof according to one embodiment of the present invention.

With reference specifically to FIG. 14 yet another feature of the present invention can be seen. The airbag 100 may include an active vent 140 that is configured to release fluid pressure within the airbag 100 at a predetermined point. As such, the depicted embodiment comprises perforations or scores in the surface 101 in order to weaken the material comprising the surface 101 to a predetermined extent. Thus, when the passenger 3000 collides with the airbag 100 the pressure within the airbag 100 increases until the perforations or scores comprising the active vent 140 fail and an aperture opens in the material, allowing gas within the airbag 100 to escape. Such an active vent 140 allows for more time to arrest the passenger's momentum, thereby reducing the overall force applied to the passenger 3000.

Now with reference to FIGS. 15 through 18, the passenger has continued on the predetermined path of travel 5000, as detailed above. Notably, the head portion 320 is received at least partially by the side support 130 and main body 110 and is at least temporarily maintained thereby, preventing the head portion 3020 from contacting other objects or surfaces that may be disposed nearby.

Figure 18:
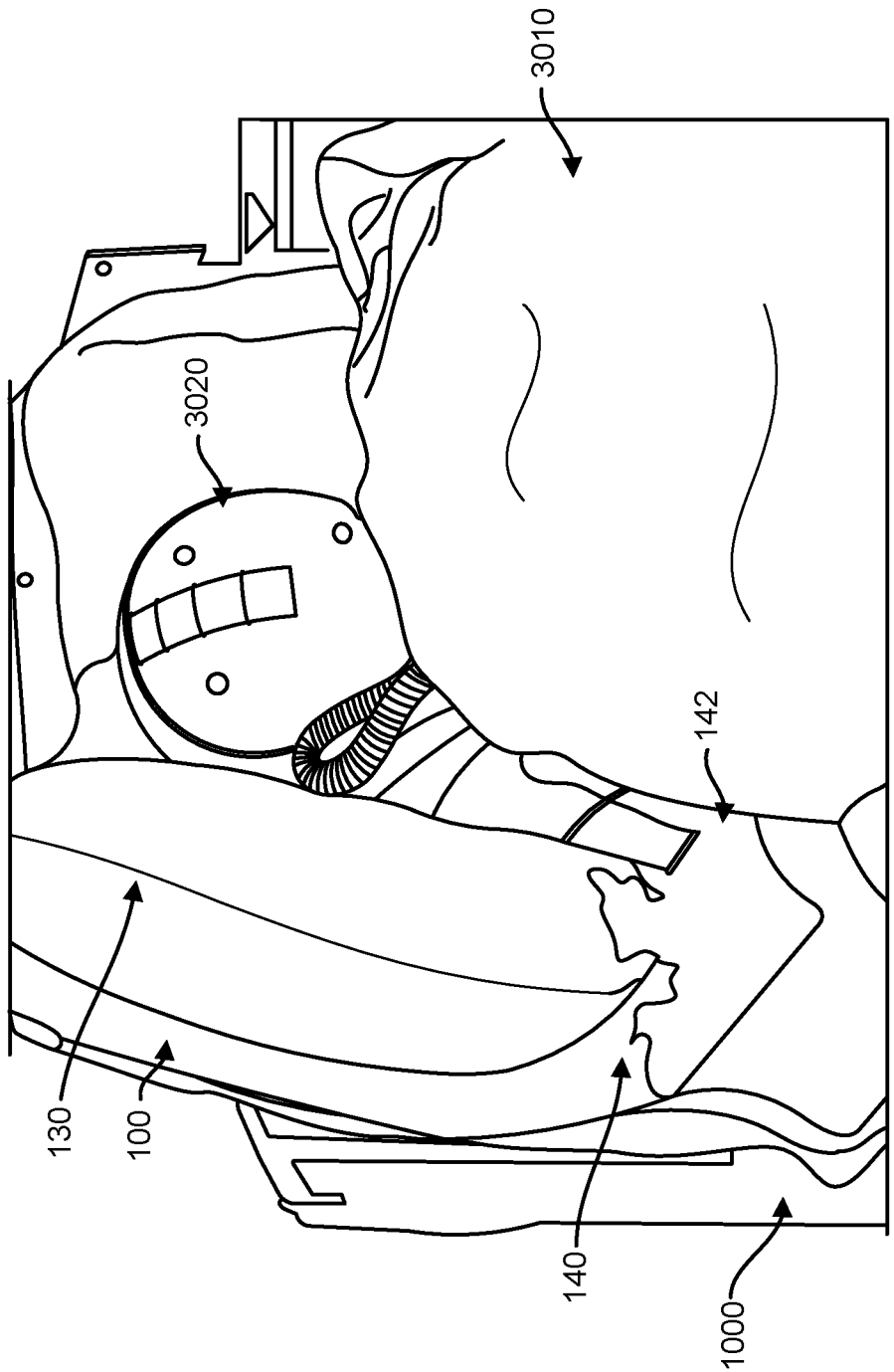
FIG. 18 is a front partial perspective view of a monument mounted airbag system during deployment of an active vent thereof according to one embodiment of the present invention.

Additionally, and with specific reference to FIG. 18, aperture 142 of the active vent has formed 140, thereby allowing gas within the airbag 100 to vent. Such a configuration reduces the stiffness or overall hardness of the airbag 100 at a predetermined point so as to first provide an initial arresting force on the passenger 3000 until the active vent 140 activates (via formation of the aperture 142). Once the active vent 140 activates, the pressure in the airbag 100 decreases, allowing a smaller arresting force to be applied to the passenger 3000 and also providing a longer distance and time over which to arrest the momentum of the passenger 3000, further decreasing the applied force to the passenger 3000.

Figure 19:
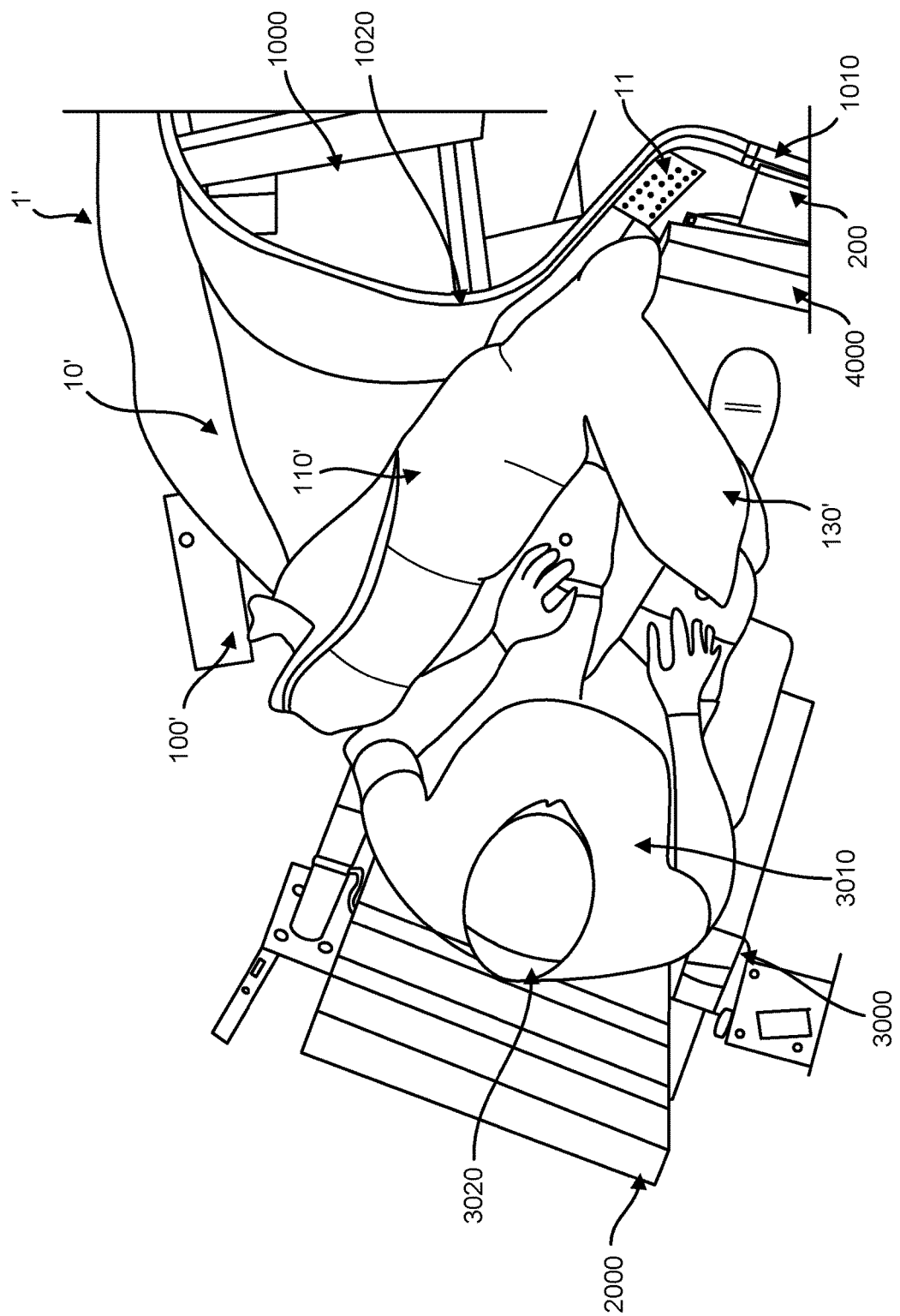
FIG. 19 is a top perspective view of a monument mounted airbag system during deployment according to another embodiment of the present invention.
Figure 20:
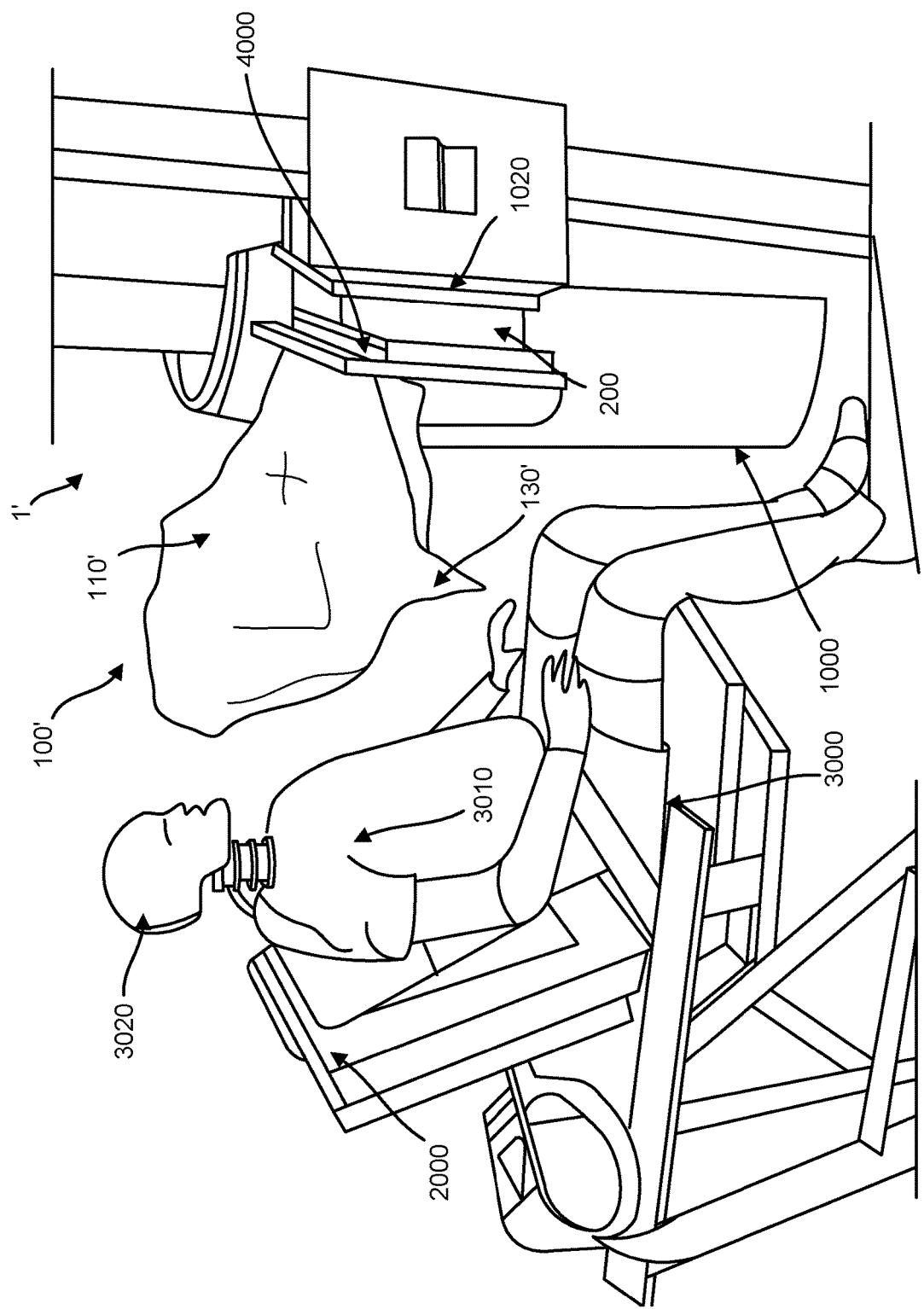
FIG. 20 is a side perspective view of a monument mounted airbag system during deployment according to another embodiment of the present invention.
Figure 21:
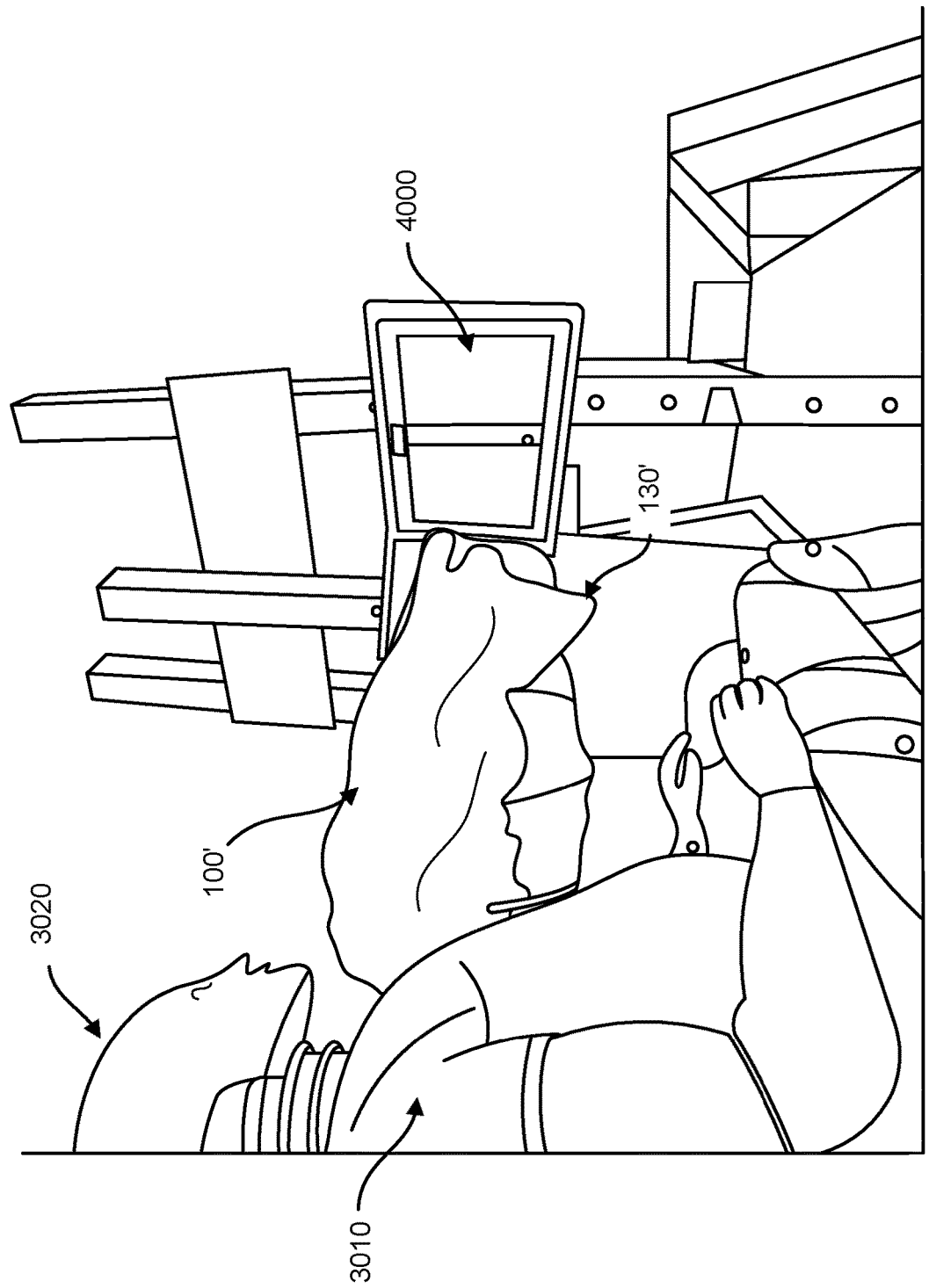
FIG. 21 is a front three-quarter perspective view of a monument mounted airbag system during deployment according to another embodiment of the present invention.

Now with reference to FIGS. 19 through 21, depicted is another embodiment of the system 1' of the present invention during deployment of the airbag 100' therein. Notably, the airbag 100' includes a side support 130' of partially elongated configuration. As such, the side support 130' of the present embodiment is more suited to projecting across a predetermined area, rather than the side support 130 of the previous embodiments, which may be more suitable to cradling and/or retaining a head portion 3020.

Figure 22:
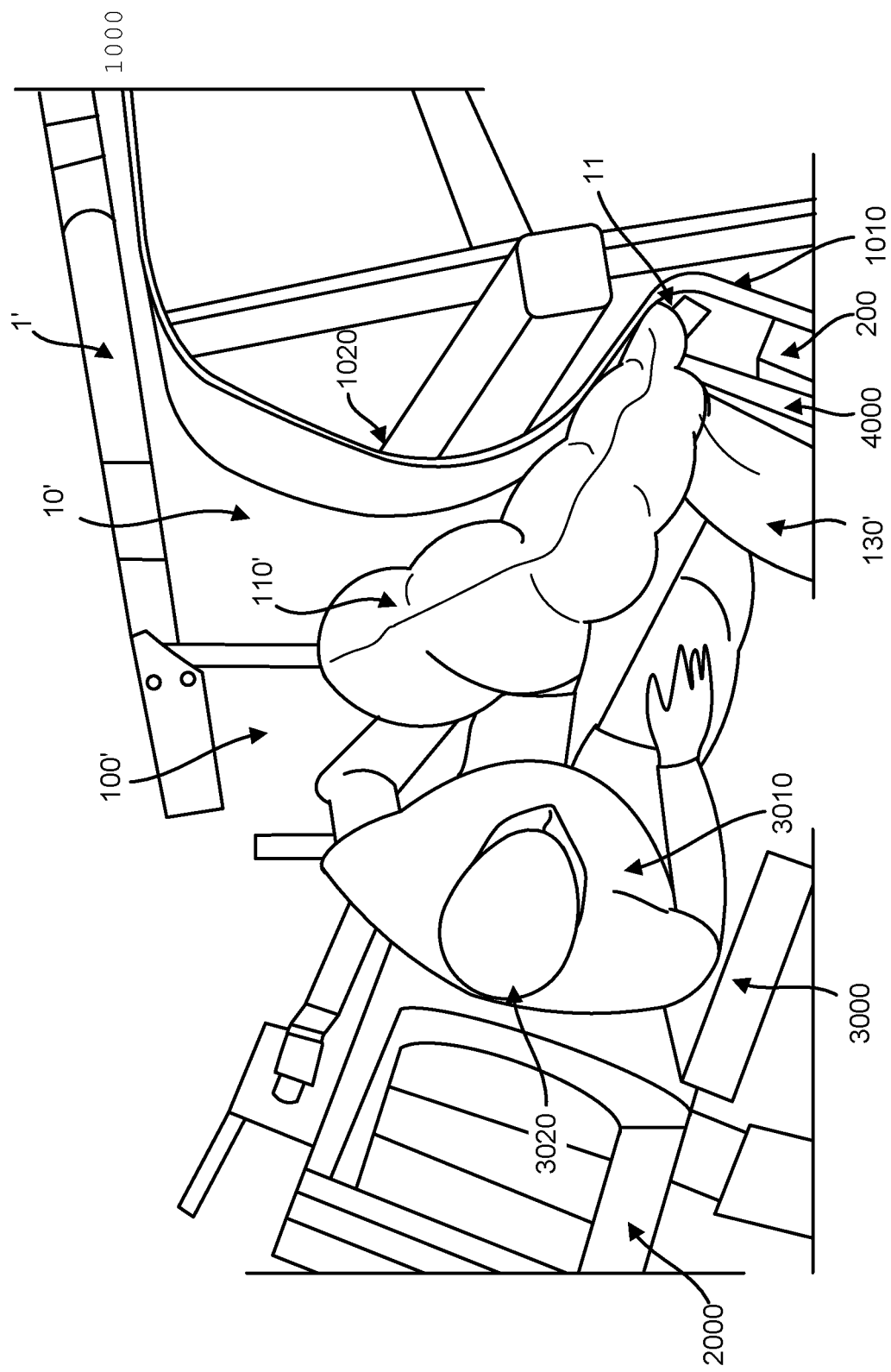
FIG. 22 is a top perspective view of a monument mounted airbag system fully deployed according to another embodiment of the present invention.
Figure 23:
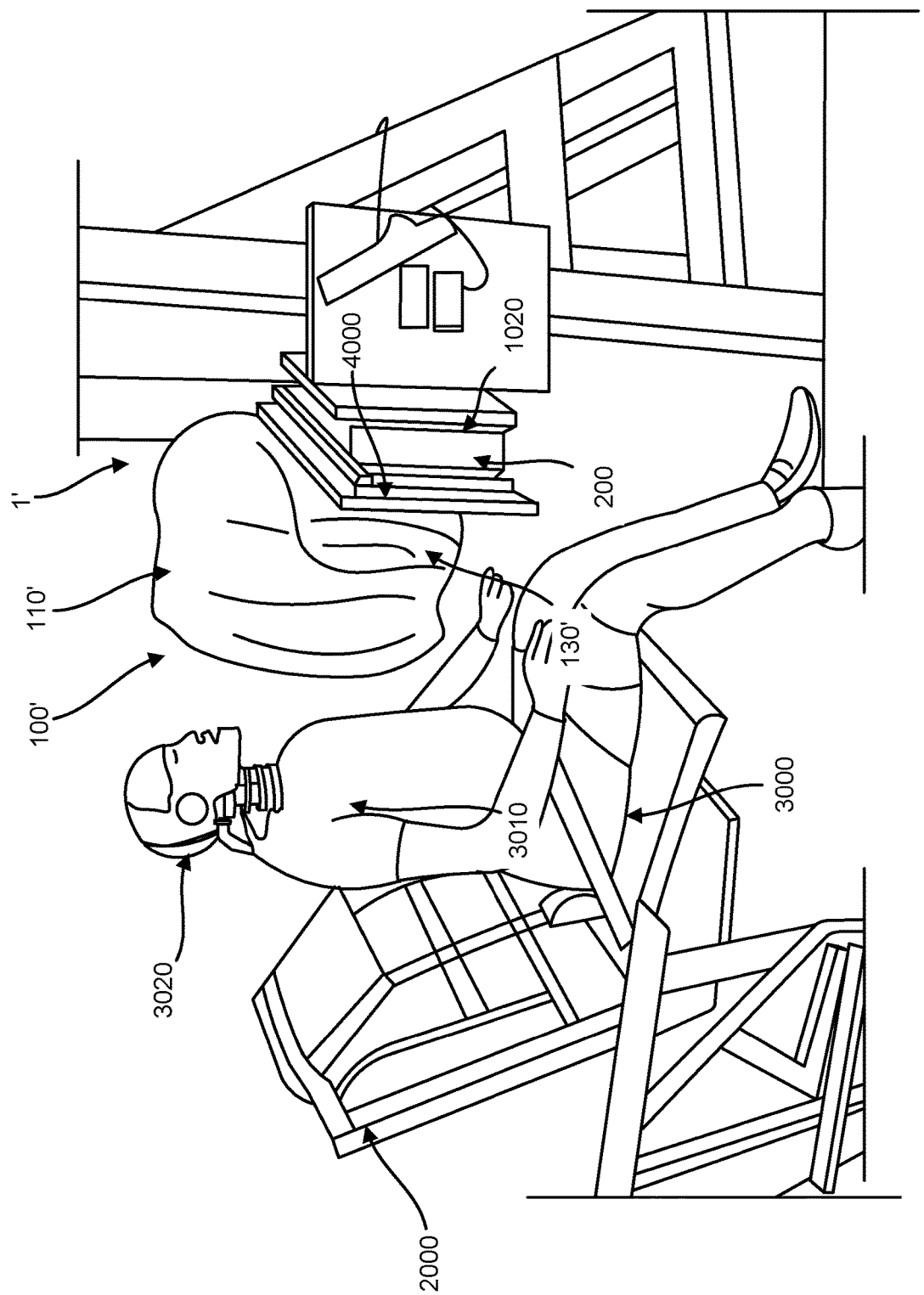
FIG. 23 is a side perspective view of a monument mounted airbag system fully deployed according to another embodiment of the present invention.
Figure 24:
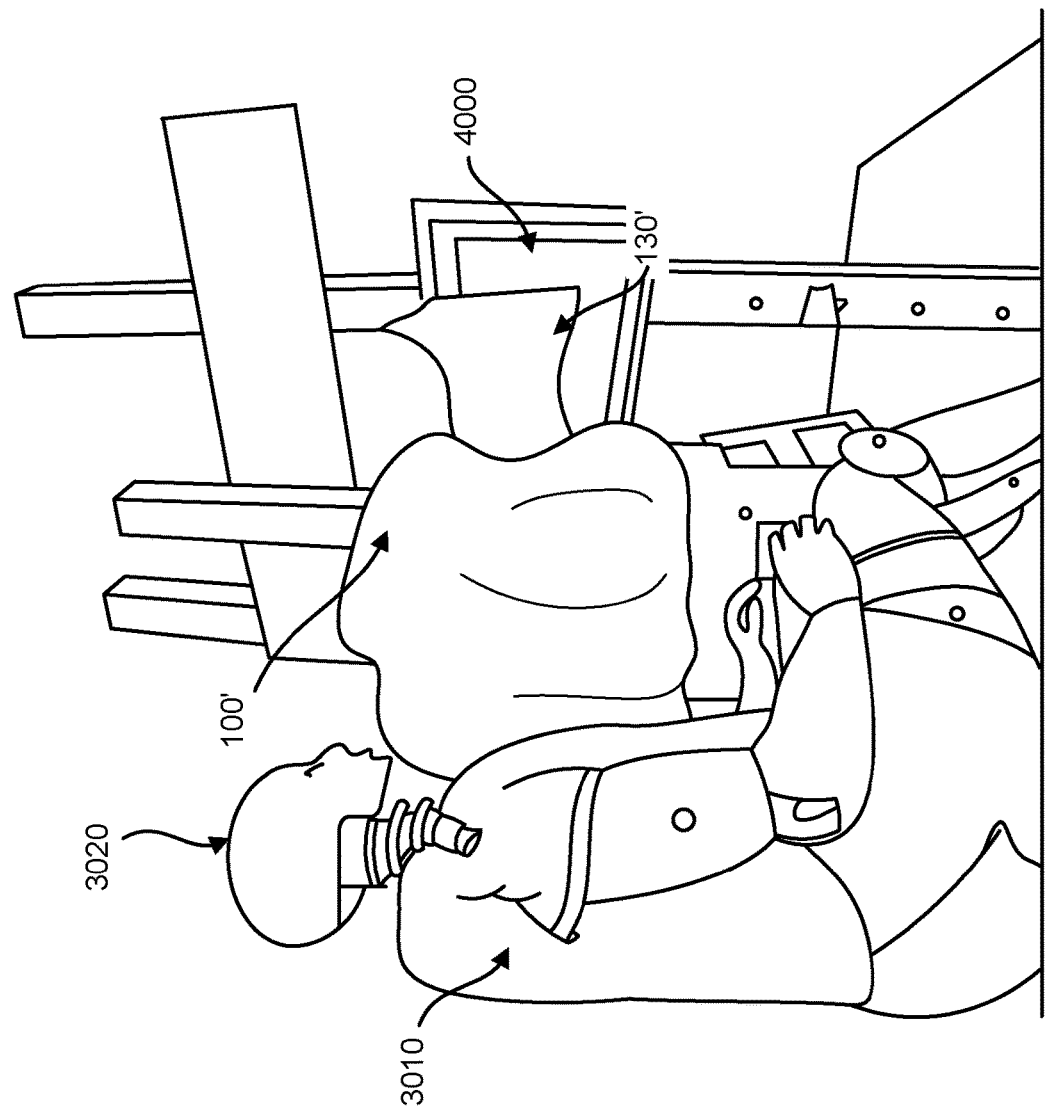
FIG. 24 is a front three-quarter perspective view of a monument mounted airbag system fully deployed according to another embodiment of the present invention.

As can be further seen, with reference now to FIGS. 22 through 24, the side support 130' is configured and disposed to project substantially across the external member 4000 when fully deployed and thereby prevent direct collision with the passenger 3000.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
We claim:

1. A monument mounted airbag system for arresting passenger movement during a sudden acceleration/deceleration event of a moving vehicle, the monument mounted airbag system comprising:
an airbag assembly comprising at least one airbag disposed on a first portion of a monument structure and configured to at least initially deploy along an intercepting course relative to a predetermined path of travel of a passenger during the sudden acceleration/deceleration event and intercept at least a portion of the passenger along the predetermined path of travel, the airbag assembly comprising a housing at least partially defined by a space between an external member and the monument structure;
wherein the monument structure is disposed adjacent to a passenger seat that is oriented at an angle relative to an expected direction of travel of the moving vehicle;
wherein the external member is mounted in spaced relation to the first portion of the monument structure; and
wherein a surface defining a main body of the at least one airbag comprises a substantially oblong shape when deployed, the oblong shape having a curved configuration along a central axis thereof, such that the main body conforms to a correspondingly curved monument structure when the at least one airbag is deployed.

2. The monument mounted airbag system of claim 1 wherein the first portion of the monument structure is disposed substantially forward of the passenger seat; and
wherein a second portion of the monument structure is laterally disposed to the passenger seat.

3. The monument mounted airbag system of claim 1 wherein the monument structure is disposed as a partition between passenger seats.

4. The monument mounted airbag system of claim 1 wherein the external member comprises a display screen.

5. The monument mounted airbag system of claim 1 wherein the main body of the at least one airbag is configured to retain a predetermined volume of gas.

6. The monument mounted airbag system of claim 1 further comprising a lower support portion of the at least one airbag in fluid communication with the main body.

7. The monument mounted airbag system of claim 6 wherein the lower support portion of the at least one airbag is configured to intercept a torso of the passenger such that the torso of the passenger collides with the lower support portion prior to, or substantially concurrently with, a head of the passenger colliding with the main body when the at least one airbag is deployed.

8. The monument mounted airbag system of claim 1 wherein the airbag assembly further comprises a side support portion of the at least one airbag configured to protrude from the main body when the at least one airbag is deployed.

9. The monument mounted airbag system of claim 8 wherein the side support portion and the main body of the at least one airbag are configured to at least partially receive a head portion of the passenger when the at least one airbag is deployed.

10. The monument mounted airbag system of claim 1 wherein the airbag assembly further comprises components disposed substantially behind the external member in relation to the passenger seat.

11. The monument mounted airbag system of claim 10 wherein the components are selected from the group consisting of an inflator, a sensor, a power supply, and an indicator.

* * * * *